United States Patent
Takeya et al.

(10) Patent No.: US 11,421,134 B2
(45) Date of Patent: Aug. 23, 2022

(54) PRESSURE-SENSITIVE ADHESIVE COMPOSITION AND USE THEREFOR

(71) Applicant: TOAGOSEI CO. LTD., Tokyo (JP)

(72) Inventors: Nobuyuki Takeya, Nagoya (JP); Kenichi Nakamura, Nagoya (JP); Yusuke Hashimoto, Nagoya (JP)

(73) Assignee: TOAGOSEI CO., LTD., Tokyo (JP)

( * ) Notice: Subject to any disclaimer, the term of this patent is extended or adjusted under 35 U.S.C. 154(b) by 0 days.

(21) Appl. No.: 16/467,637

(22) PCT Filed: Dec. 7, 2017

(86) PCT No.: PCT/JP2017/043901
§ 371 (c)(1),
(2) Date: Jun. 7, 2019

(87) PCT Pub. No.: WO2018/105673
PCT Pub. Date: Jun. 14, 2018

(65) Prior Publication Data
US 2019/0322911 A1 Oct. 24, 2019

(30) Foreign Application Priority Data

Dec. 9, 2016 (JP) .............................. JP2016-239867

(51) Int. Cl.
| | | |
|---|---|---|
| C09J 133/06 | (2006.01) | |
| C09J 133/08 | (2006.01) | |
| C09J 133/10 | (2006.01) | |
| C09J 133/12 | (2006.01) | |
| C09J 133/14 | (2006.01) | |
| C09J 7/38 | (2018.01) | |
| C09J 7/20 | (2018.01) | |

(52) U.S. Cl.
CPC .............. *C09J 133/06* (2013.01); *C09J 7/20* (2018.01); *C09J 7/385* (2018.01); *C09J 133/08* (2013.01); *C09J 133/10* (2013.01); *C09J 133/12* (2013.01); *C09J 133/14* (2013.01); *C09J 2301/302* (2020.08); *C09J 2301/312* (2020.08); *C09J 2433/00* (2013.01); *C09J 2467/006* (2013.01)

(58) Field of Classification Search
None
See application file for complete search history.

(56) References Cited

U.S. PATENT DOCUMENTS

| 5,814,685 | A * | 9/1998 | Satake ................ | C09D 11/326 |
|---|---|---|---|---|
| | | | | 523/201 |
| 7,070,051 | B2 * | 7/2006 | Kanner ............ | A61B 17/06133 |
| | | | | 206/382 |
| 2009/0033833 | A1 | 2/2009 | Aminaka | |
| 2013/0005910 | A1 | 1/2013 | Okamoto et al. | |

FOREIGN PATENT DOCUMENTS

| CN | 102812100 A | 12/2012 |
|---|---|---|
| CN | 103562333 A | 2/2014 |
| JP | 2006-301572 A | 11/2006 |
| JP | 2011-232470 A | 11/2011 |
| JP | 2012-041453 A | 3/2012 |
| JP | 2014-005387 A | 1/2014 |
| JP | 2014-077096 A | 5/2014 |
| JP | 2014-088549 A | 5/2014 |
| JP | 2015-151432 A | 8/2015 |
| JP | 2015-160915 A | 9/2015 |
| WO | 2011/118183 A1 | 9/2011 |
| WO | 2012/128294 A1 | 9/2012 |
| WO | 2016/199787 A1 | 12/2016 |

OTHER PUBLICATIONS

Machine translation of JP 2015160915 A (Year: 2015).*
Aldrich Data Sheet (Year: 2020).*
Jan. 30, 2018 International Search Report issued in Internatinal Patent Application No. PCT/JP2017/043901.
Jan. 30, 2018 Writen Opinion issued in International Patent Application No. PCT/JP2017/043901.
May 27, 2020 extended European Search Report issued in European Patent Application No. 17878302.3.
Sep. 3, 2020 Office Action issued in Chinese Patent Application No. 201780076239.9.
Jul. 21, 2020 Office Action issued in Japanese Patent Application No. 2018-555051.
Apr. 28, 2021 Office Action issued in European Patent Application No. 17 878 302.3.
May 25, 2021 Office Action issued in Chinese Patent Application No. 201780076239.9.
Dec. 17, 2020 Office Action issued in Taiwanese Patent Application No. 106140038.
Jan. 11, 2022 Office Action issued in European Patent Application No. 17 878 302.3.

* cited by examiner

*Primary Examiner* — Frank D Ducheneaux
(74) *Attorney, Agent, or Firm* — Oliff PLC

(57) ABSTRACT

An adhesive composition which contains a vinyl polymer and an acrylic adhesive polymer, and wherein: the vinyl polymer has a glass transition temperature (Tg) of from 60° C. to 200° C. (inclusive) and a number-average molecular weight of from 500 to 10,000; and the vinyl polymer is contained in an amount of from 0.5 part by mass to 60 parts by mass per 100 parts by mass of the acrylic adhesive polymer. If this adhesive composition is applied to a separator and then dried, thereby obtaining an adhesive layer, a first Tg that is the glass transition temperature of the entire adhesive layer is from −80° C. to 10° C., and a second Tg that is the glass transition temperature calculated from a surface layer portion of the adhesive layer as determined by X-ray photoelectron spectroscopy is 40° C. or higher, and is higher than the first Tg by 30° C. or more.

3 Claims, No Drawings

PRESSURE-SENSITIVE ADHESIVE COMPOSITION AND USE THEREFOR

This is a National Phase of Application No. PCT/JP2017/043901 filed Dec. 7, 2017, which claims the benefit of Japanese Application No. 2016-239867 filed Dec. 9, 2016. The disclosure of each of the prior applications is hereby incorporated by reference herein in its entirety.

TECHNICAL FIELD

This description relates to pressure-sensitive adhesive composition and to a use therefor.

BACKGROUND ART

Pressure-sensitive adhesive compositions are worked into various forms including films, tapes and labels for example, and used in a wide range of applications. They are also applied to a range of substances including glass and plastic in various flat panel displays (FPDs) such as liquid crystal displays (LCDs) and plasma display panels (PDPs).

For example, pressure-sensitive adhesives used in display applications are required to be highly durable and heat resistant in order to prevent lifting and peeling from the adherend under high-temperature, high-humidity conditions.

From the standpoint of heat resistance and the like, pressure-sensitive adhesive compositions containing high-molecular-weight acrylic polymers and low-molecular-weight acrylic polymers have been disclosed (Patent Literature 1 and 2). In addition to other properties, these pressure-sensitive adhesive compositions achieve resistance to lifting and peeling under high-temperature, high-humidity conditions (60° C., 90% RH) and high-temperature conditions (80° C.) through a combination of acrylic polymers with different molecular weights.

It has also been disclosed (Patent Literature 3) that lifting and peeling after high-humidity load (60° C., 95% RH and 85° C., 85% RH) can be prevented with a pressure-sensitive adhesive composition containing a specific vinyl polymer and acrylic pressure-sensitive adhesive polymer even when the adherend is a plastic plate.

CITATION LIST

Patent Literature 1: Japanese Patent Application Publication No. 2012-41453
Patent Literature 2: Japanese Patent Application Publication No. 2011-232470
Patent Literature 3: Japanese Patent Application Publication No. 2014-88549

SUMMARY OF INVENTION

Technical Problem

However, greater and greater heat resistance (durability) is being demanded in recent years. In the case of automotive touch panels for example, resistance to temperatures around 100° C. may be required. In the case of displays having curvature for design purposes and the like, heat resistance under high-temperature conditions exceeding 100° C. is required when the display is worked by bending it at a high temperature.

From the standpoint of the handling and reworking properties, moreover, there is demand for pressure-sensitive adhesives that have low tackiness but strong adhesion under heat and pressure when a display is subject to pressure-sensitive adhesive sheet processing for example.

The pressure-sensitive adhesive compositions described in Patent Literature 1 and 2 cannot adequately prevent lifting and peeling due to outgassing from the plastic plate under high-temperature, high-humidity conditions. Moreover, even the pressure-sensitive adhesive composition described in Patent Literature 3 has not been durable under severe conditions near 100° C.

The present description provides a pressure-sensitive adhesive composition with even greater heat resistance, along with a use therefor.

Solution to Technical Problem

The inventors succeeded in further improving heat resistance by combining an acrylic pressure-sensitive adhesive polymer as a base polymer component with a specific vinyl polymer as a tackifying component. We also discovered that a specific combination has low tackiness as well as strong adhesive force under heat and pressure. The present description provides the following means.

(1) A pressure-sensitive adhesive composition, including: a vinyl polymer (A) and an acrylic pressure-sensitive adhesive polymer (B), wherein
the vinyl polymer (A) has a glass transition temperature (Tg) of 60° C. to 200° C. and a number-average molecular weight of 500 to 10,000, and is contained in an amount of 0.5 mass parts to 60 mass parts per 100 mass parts of the acrylic pressure-sensitive adhesive polymer (B), and
when the pressure-sensitive adhesive composition is coated on a separator and dried to obtain a pressure-sensitive adhesive layer, a first Tg, which is a glass transition temperature of the pressure-sensitive adhesive layer as a whole, is −80° C. to 10° C., and
a second Tg, which is a glass transition temperature calculated from the surface layer part based on X-ray photoelectron spectroscopy of the pressure-sensitive adhesive layer, is at least 40° C., and is at least 30° C. higher than the first Tg.

(2) The pressure-sensitive adhesive composition according to (1), wherein the first Tg is −30° C. to 5° C., and the second Tg is 50° C. to 180° C.

(3) The pressure-sensitive adhesive composition according to (2), wherein the first Tg is −25° C. to 1° C., and the second Tg is 70° C. to 180° C.

(4) The pressure-sensitive adhesive composition according to any one of (1) to (3), wherein the glass transition temperature of the acrylic pressure-sensitive adhesive polymer (B) is −80° C. to 10° C.

(5) The pressure-sensitive adhesive composition according to (4), wherein the glass transition temperature of the acrylic pressure-sensitive adhesive polymer (B) is −30° C. to 10° C.

(6) The pressure-sensitive adhesive composition according to any one of (1) to (5), wherein at least one kind of compound selected from the group consisting of the (meth)acrylic acid alkoxyalkyl esters having $C_{2-4}$ alkoxyalkyl groups and the (meth)acrylic acid alkyl esters having $C_{1-3}$ alkyl groups is contained in the amount of 10 mass % to 99 mass % of the total monomer units constituting the acrylic pressure-sensitive adhesive polymer (B).

(7) The pressure-sensitive adhesive composition according to any one of (1) to (6), wherein a (meth)acrylic acid alkyl ester having a $C_{1-3}$ alkyl group is contained in the amount of 10 mass % to 80 mass % of the total monomer units constituting the acrylic pressure-sensitive adhesive polymer (B).

(8) The pressure-sensitive adhesive composition according to any one of (1) to (7), wherein a peeling strength of a pressure-sensitive adhesive sheet, the pressure-sensitive adhesive sheet including a 50 μm-thick pressure-sensitive adhesive layer of the pressure-sensitive adhesive composition and a 100 μm-thick polyethylene terephthalate film substrate on which the pressure-sensitive adhesive layer is attached, to a glass plate at 100° C. is at least 5.0 N/25 mm.

(9) The pressure-sensitive adhesive composition according to any one of (1) to (8), wherein the vinyl polymer (A) is contained in the amount of 10 mass parts to 60 mass parts per 100 mass parts of the acrylic pressure-sensitive adhesive polymer (B).

(10) A pressure-sensitive adhesive product provided with a pressure-sensitive adhesive layer, wherein the pressure-sensitive adhesive layer contains a pressure-sensitive adhesive composition including a vinyl polymer (A) and an acrylic pressure-sensitive adhesive polymer (B), and the vinyl polymer (A) has a glass transition temperature (Tg) of 60° C. to 200° C. and a number-average molecular weight of 500 to 10,000, and is contained in the amount of 0.5 mass parts to 60 mass parts per 100 mass parts of the acrylic pressure-sensitive adhesive polymer (B), and when the pressure-sensitive adhesive composition is coated on a separator and dried to obtain a pressure-sensitive adhesive layer, a first Tg, which is a glass transition temperature of the pressure-sensitive adhesive layer as a whole, is −80° C. to 10° C., and a second Tg, which is a glass transition temperature calculated from the surface layer part based on X-ray photoelectron spectroscopy of the pressure-sensitive adhesive layer, is at least 40° C., and is at least 30° C. higher than the first Tg.

(11) The pressure-sensitive adhesive product according to (10), which is a pressure-sensitive adhesive sheet or pressure-sensitive adhesive tape including the pressure-sensitive adhesive layer on one or both sides of a substrate.

DESCRIPTION OF EMBODIMENTS

This description relates to a specific pressure-sensitive adhesive composition containing a predetermined vinyl polymer and a predetermined acrylic pressure-sensitive adhesive polymer and having a specific glass transition temperature configuration, to a method for manufacturing the pressure-sensitive adhesive composition, and to a pressure-sensitive adhesive product using the pressure-sensitive adhesive composition.

By combining an acrylic pressure-sensitive adhesive polymer (B) with a vinyl polymer (A) having a predetermined glass transition temperature and number-average molecular weight, the pressure-sensitive adhesive composition disclosed in this description (hereunder sometimes called simply "the pressure-sensitive adhesive composition") can achieve the property of having a specific glass transition temperature configuration when the pressure-sensitive adhesive layer is formed, namely, a glass transition temperature (first Tg) of −80° C. to 10° C. of the entire pressure-sensitive adhesive layer with the vinyl polymer (A) segregated on the surface layer side of the pressure-sensitive adhesive layer, and a glass transition temperature as calculated from the surface layer part based on X-ray photoelectron spectroscopy of the pressure-sensitive adhesive layer (second Tg) that is at least 40° C. and at least 30° C. higher than the first Tg, thereby providing excellent heat resistance.

With this pressure-sensitive adhesive composition, it is possible to obtain a pressure-sensitive adhesive product with good heat-resistance whereby loss of adhesiveness and loss of bubbling resistance can be controlled or prevented even under high-temperature conditions and high-temperature, high-humidity conditions. Furthermore, because bubbling due to outgassing can be controlled even when the pressure-sensitive adhesive product is used under high-humidity conditions and high-temperature conditions of at least 100° C., problems such as reduced visibility due to swelling or peeling of the pressure-sensitive adhesive product can also be controlled or prevented.

The disclosures of this description are explained in detail below. In this description, the term "(meth)acrylic" means acrylic and/or methacrylic, and the term "(meth)acrylate" means acrylate and/or methacrylate. The term "(meth)acryloyl group" means an acryloyl group and/or methacryloyl group.

(The Pressure-Sensitive Adhesive Composition)

The pressure-sensitive adhesive composition contains a vinyl polymer (A) and an acrylic pressure-sensitive adhesive polymer (B). This vinyl polymer (A) and acrylic pressure-sensitive adhesive polymer (B) and the pressure-sensitive adhesive composition containing them are explained in that order below.

[Vinyl Polymer (A)]

The vinyl polymer (A) of the invention may have a Tg of 60° C. to 200° C. The range of the Tg depends partly on the Tg of the acrylic pressure-sensitive adhesive polymer (B), but good heat resistance is obtained more easily if the Tg of the vinyl polymer (A) is high. If the Tg is less than 60° C., the adhesive strength on various adherends may be inadequate under high-temperature conditions, and durability may be inferior. The Tg generally does not exceed 200° C. due to restrictions on the raw material monomers and the like.

The lower limit of the Tg of the vinyl monomer (A) may be at least 70° C. for example, or at least 75° C. for example, or at least 80° C. for example, or at least 85° C. for example, or at least 90° C. for example, or at least 95° C. for example, or at least 100° C. for example, or at least 105° C. for example or at least 110° C. for example. The upper limit may be not more than 180° C. for example, or not more than 150° C. for example, or not more than 140° C. for example, or not more than 130° C. for example, or not more than 120° C. for example. It may also be not more than 100° C. for example. The range of the Tg can be set by appropriately combining such a minimum temperature and maximum temperature, and may be 60° C. to 180° C., or 70° C. to 150° C. for example. It may also be 70° C. to 130° C. for example, or 75° C. to 130° C. for example, or 80° C. to 120° C. for example, or 85° C. to 120° C. for example, or 90° C. to 120° C. for example, or 95° C. to 120° C. for example.

The Tg of the vinyl polymer (A) may be a value measured by differential scanning calorimetry (DSC) at a temperature elevation rate of 10° C. per minute.

Various radical polymerizable vinyl unsaturated compounds may be used as monomers constituting the vinyl polymer (A). The vinyl polymer (A) can thus have structural units derived from at least one kind of monomer selected from the group consisting of such vinyl unsaturated compounds. Examples of such compounds include (meth)acrylic acid ester compounds, alicyclic vinyl compounds, aromatic vinyl compounds, unsaturated carboxylic acids, unsaturated acid anhydrides, hydroxyl group-containing vinyl compounds, amino group-containing vinyl compounds, amido group-containing vinyl compounds, alkoxy group-containing vinyl compounds, cyano group-containing vinyl compounds, nitrile group-containing vinyl compounds, and maleimide compounds and the like. These compounds may be used individually, or a combination of two or more kinds may be used.

Examples of the (meth)acrylic acid ester compounds include (meth)acrylic acid ester compounds containing linear or branched alkyl groups, such as methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, amyl (meth)acrylate, n-hexyl (meth)acrylate, n-octyl (meth)acrylate, 2-ethylhexyl (meth)acrylate, n-dodecyl (meth)acrylate and n-octadecyl (meth)acrylate. These compounds may be used individually, or a combination of two or more kinds may be used. Of these, methyl methacrylate is preferred for ease of obtaining a vinyl polymer (A) with a high Tg.

A (meth)acrylic acid ester compound can be used by preference as the vinyl unsaturated compound constituting the vinyl polymer (A). The amount of the (meth)acrylate ester compound used is not particularly limited, but may be for example at least 10 mass %, or at least 15 mass %, or at least 20 mass %, or at least 25 mass %, or at least 30 mass %, or at least 35 mass %, or at least 40 mass %, or at least 50 mass %, or at least 60 mass %, or at least 70 mass % for example. The upper limit may be not more than 95 mass %, or not more than 90 mass %, or not more than 85 mass %, or not more than 80 mass %, or not more than 75 mass %, or not more than 70 mass %, or not more than 65 mass % for example. The range of the amount used may be set by appropriately combining these upper and lower limits, and for example the amount used may be 20 mass % to 90 mass %, or 30 mass % to 90 mass %, or 40 mass % to 90 mass %, or 40 mass % to 70 mass % for example.

Examples of the alicyclic vinyl compounds include cyclohexyl (meth)acrylate, methyl cyclohexyl (meth)acrylate, t-butyl cyclohexyl (meth)acrylate, cyclododecyl (meth)acrylate, isobornyl (meth)acrylate, adamantyl (meth)acrylate, dicyclopentenyl (meth)acrylate and dicyclopentanyl (meth)acrylate. These compounds may be used individually, or a combination of two or more kinds may be used.

Of these, isobornyl (meth)acrylate, dicyclopentanyl (meth)acrylate, cyclohexyl (meth)acrylate and adamantyl (meth)acrylate may be used from the standpoint of setting a relatively high Tg, easily segregating the vinyl polymer (A) in the surface layer when forming the pressure-sensitive adhesive layer, and obtaining good pressure-sensitive adhesive performance. Of these, isobornyl (meth)acrylate may be used.

An alicyclic vinyl compound is desirable because it tends to produce good adhesive performance in the pressure-sensitive adhesive layer. Using these vinyl compounds, it is easier to obtain a vinyl polymer (A) having low polarity relative to the acrylic pressure-sensitive adhesive polymer (B), and easier to segregate the vinyl polymer (A) in the surface layer when forming the pressure-sensitive adhesive layer.

The specific amounts (total amount) of one or two or more kinds of monomers selected from these alicyclic vinyl compounds may be set appropriately, but for example the lower limit may be at least 3 mass %, or at least 5 mass %, or at least 10 mass %, or at least 15 mass %, or at least 20 mass %, or at least 25 mass %, or at least 30 mass % for example. The upper limit may be not more than 80 mass %, or not more than 70 mass %, or not more than 60 mass %, or not more than 55 mass %, or not more than 50 mass %, or not more than 45 mass %, or not more than 40 mass % for example. The range of the compound used may be set by appropriately combining these upper and lower limits, and may be 3 mass % to 80 mass %, or 5 mass % to 70 mass % for example, or may be 10 mass % to 50 mass %, or 20 mass % to 40 mass % for example.

The vinyl polymer (A) is preferably provided with monomer units derived from a (meth)acrylic acid ester compound and an alicyclic vinyl compound as monomers. For example, the monomer units derived from these constitute at least 80 mass %, or at least 85 mass %, or at least 90 mass %, or at least 95 mass %, or 100 mass % for example of the total monomer units.

Examples of the aromatic vinyl compounds include styrene, α-methylstyrene, o-methylstyrene, p-methylstyrene, vinyl toluene, β-methylstyrene, ethyl styrene, p-tert-butylstyrene, vinyl xylene, vinyl naphthalene and the like. These compounds may be used individually, or a combination of two or more kinds may be used. For example, styrene or the like may be used.

Examples of the unsaturated carboxylic acids include (meth)acrylic acid, ethacrylic acid, maleic acid, fumaric acid, itaconic acid, crotonic acid, citraconic acid, cinnamic acid, and monoalkyl esters of unsaturated dicarboxylic acids (monoalkyl esters of maleic acid, fumaric acid, itaconic acid, citraconic acid, maleic anhydride, itaconic anhydride, citraconic anhydride, etc.) and the like. These compounds may be used individually, or a combination of two or more kinds may be used.

Examples of the unsaturated acid anhydrides include maleic anhydride, itaconic anhydride and citraconic anhydride. These compounds may be used individually, or a combination of two or more kinds may be used.

Examples of the hydroxyl group-containing vinyl compounds include 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate, and mono (meth)acrylate esters of polyalkylene glycols such as polyethylene glycol and polypropylene glycol, as well as p-hydroxystyrene, m-hydroxystyrene, o-hydroxystyrene, p-isopropenylphenol, m-isopropenylphenol, o-isopropenylphenol and the like. These compounds may be used individually, or a combination of two or more kinds may be used.

Examples of the amino group-containing vinyl compounds include dimethylaminomethyl (meth)acrylate, diethylaminomethyl (meth)acrylate, 2-dimethylaminoethyl (meth)acrylate, 2-diethylaminoethyl (meth)acrylate, 2-(di-n-propylamino)ethyl (meth)acrylate, 2-dimethylaminopropyl (meth)acrylate, 2-diethylaminopropyl (meth)acrylate, 2-(di-n-propylamino) propyl (meth)acrylate, 3-dimethylaminopropyl (meth)acrylate, 3-diethylaminopropyl (meth)acrylate, 3-(di-n-propylamino)propyl (meth)acrylate and the like. These compounds may be used individually, or a combination of two or more kinds may be used.

Examples of the amido group-containing vinyl compounds include (meth)acrylamide, N,N-dimethyl (meth)acrylamide, N,N-dimethylaminopropyl (meth)acrylamide, N-methylol (meth)acrylamide and the like. These compounds may be used individually, or a combination of two or more kinds may be used.

Examples of the alkoxy group-containing vinyl compounds include methoxyethyl (meth)acrylate, ethoxyethyl (meth)acrylate, n-propoxyethyl (meth)acrylate, n-butoxyethyl (meth)acrylate, methoxypropyl (meth)acrylate, ethoxypropyl (meth)acrylate, n-propoxypropyl (meth)acrylate, n-butoxypropyl (meth)acrylate and the like. These compounds may be used individually, or a combination of two or more kinds may be used.

Examples of the cyano group-containing vinyl compounds include cyanomethyl (meth)acrylate, 1-cyanoethyl (meth)acrylate, 2-cyanoethyl (meth)acrylate, 1-cyanopropyl (meth)acrylate, 2-cyanopropyl (meth)acrylate, 3-cyanopropyl (meth)acrylate, 4-cyanobutyl (meth)acrylate, 6-cyanohexyl (meth)acrylate, 2-ethyl-6-cyanohexyl (meth)acrylate, 8-cyanooctyl (meth)acrylate and the like. These compounds may be used individually, or a combination of two or more kinds may be used.

Examples of the nitrile group-containing vinyl compounds include (meth)acrylonitrile, ethacrylonitrile, α-ethylacrylonitrile, α-isopropylacrylonitrile, α-chloroacrylonitrile, α-fluoroacrylonitrile and the like. These compounds may be used individually, or a combination of two or more kinds may be used.

Examples of the maleimide compounds include maleimide, N-methylmaleimide, N-isopropylmaleimide, N-butylmaleimide, N-dodecylmaleimide, N-cyclohexylmaleimide, N-phenylmaleimide, N-(2-methylphenyl)maleimide, N-(4-methylphenyl)maleimide, N-(2,6-dimethylphenyl)maleimide, N-(2,6-diethylphenyl)maleimide, N-benzylmaleimide, N-naphthylmaleimide and the like. These compounds may be used individually, or a combination of two or more kinds may be used.

Apart from these compounds, dialkyl esters of unsaturated dicarboxylic acids, vinyl ester compounds, and vinyl ether compounds and the like may also be used.

Examples of the dialkyl esters of unsaturated dicarboxylic acids include dialkyl esters of maleic acid, fumaric acid, itaconic acid, citraconic acid, maleic anhydride, itaconic anhydride, citraconic anhydride and the like.

Examples of the vinyl ester compounds include methylene aliphatic monocarboxylic acid esters, vinyl acetate, vinyl propionate, vinyl pivalate, vinyl butyrate, vinyl benzoate, vinyl formate, vinyl cinnamate and the like.

Examples of the vinyl ether compounds include vinyl methyl ether, vinyl ethyl ether, vinyl n-butyl ether, vinyl isobutyl ether, vinyl phenyl ether, vinyl cyclohexyl ether and the like.

The number-average molecular weight (Mn) of the vinyl polymer (A) may be 500 to 10,000. The lower limit may be at least 1,000, or at least 1,500. The upper limit may be not more than 7,000, or not more than 5,000, or not more than 4,000. The range may be 500 to 7,000, or 1,000 to 5,000. If the Mn exceeds 10,000, compatibility with the acrylic pressure-sensitive adhesive polymer (B) declines. On the other hand, manufacturing a polymer with an Mn of less than 500 is problematic from the standpoint of productivity and the like because it uses large quantities of a polymerization initiator or chain transfer agent.

To more easily obtain good adhesive strength, the ratio (Mw/Mn) of the weight-average molecular weight (Mw) and the (Mn) is not more than 3.0 for example, or not more than 2.2, or not more than 1.9, or not more than 1.8, or not more than 1.7, or not more than 1.6 for example. The number-average molecular weight (Mn) and weight-average molecular weight (Mw) here are standard polystyrene conversion values obtained by gel permeation chromatography (GPC).

The vinyl polymer (A) of the invention is not particularly limited as to manufacturing method, but it can be easily obtained by using a known radical polymerization method such as solution polymerization, bulk polymerization, suspension polymerization or emulsion polymerization for example to polymerize the monomers. In the case of solution polymerization, the target vinyl polymer can be obtained by loading an organic solvent and a vinyl monomer raw material into a reactor, adding a thermal polymerization initiator such as an organic peroxide or azo compound, and then heating the mixture to 50° C. to 300° C. to copolymerize the monomers. This vinyl polymer can be used as a solution dissolved in an organic solvent, or after removing the solvent by heating and pressure reduction treatment or the like.

The method of loading the raw materials including the monomers may be a batch-type initial batch loading method in which all the raw materials are loaded at once, or a semi-continuous method in which at least one raw material is supplied continuously to the reactor, or a continuous polymerization method in which all raw materials are supplied continuously while simultaneously extracting the resin product continuously from the reactor.

An organic hydrocarbon compound is suitable as the organic solvent used in solution polymerization or the like, and examples include cyclic ethers such as tetrahydrofuran and dioxane, aromatic hydrocarbon compounds such as benzene, toluene and xylene, esters such as ethyl acetate and butyl acetate, ketones such as acetone, methyl ethyl ketone and cyclohexanone, methyl orthoformate, methyl orthoacetate, and alcohols such as methanol, ethanol and isopropanol, and one or two or more kinds may be used. Of these polymerization solvents, ethyl acetate, butyl acetate, acetone and methyl ethyl ketone can be used because they dissolve vinyl polymers well and have relatively low boiling points to facilitate purification.

The initiator used in the invention may be an azo compound, organic peroxide, inorganic peroxide or the like, without any particular limitations. A redox polymerization initiator including a known oxidizing agent and reducing agent may also be used. Similarly, a known chain transfer agent may also be included.

Examples of the azo compound include 2,2'-azobis(isobutyronitrile), 1,1-azobis(cyclohexane-1-carbonitrile), azocumene, 2,2'-azobis(2-methylbutyronitrile), 2,2'-azobismethylvaleronitrile, 4,4'-azobis(4-cyanovaleric acid), 2-(tert-butylazo)-2-cyanopropane, 2,2'-azobis(2,4,4-trimethylpentane), 2,2'-azobis(2-methylpropane), dimethyl-2,2'-azobis(2-methylpropionate) and the like.

Examples of the organic peroxide include cyclohexanone peroxide, 3,3,5-trimethylcyclohexanone peroxide, methyl cyclohexanone peroxide, 1,1-bis(tert-butylperoxy)-3,3,5-trimethylcyclohexane, 1,1-bis(tert-butylperoxy)cyclohexane, n-butyl-4,4-bis(tert-butylperoxy)valerate, cumene hydroperoxide, 2,5-dimethylhexane-2,5-dihydroperoxide, 1,3-bis[(tert-butylperoxy)-m-isopropyl]benzene, 2,5-dimethyl-2,5-di(tert-butylperoxy)hexane, diisopropyl benzene peroxide, tert-butyl cumyl peroxide, decanoyl peroxide, lauroyl peroxide, benzoyl peroxide, 2,4-dichlorobenzoyl peroxide, bis(tert-butylcyclohexyl)peroxydicarbonate, tert-butyl peroxybenzoate, 2,5-dimethyl-2,5-di(benzoylperoxy)hexane and the like.

Examples of the inorganic peroxide include potassium peroxide, sodium peroxide, ammonium peroxide and the like.

For the redox polymerization initiator, sodium sulfite, sodium thiosulfate, sodium formaldehyde sulfoxylate, ascorbic acid, ferrous sulfate or the like may be used as the reducing agent, and potassium peroxodisulfate, hydrogen peroxide, tert-butyl hydroperoxide or the like as the oxidizing agent.

A known chain transfer agent may be used as necessary to adjust the molecular weight of the vinyl polymer (A).

Examples of the chain transfer agent include ethanethiol, butanethiol, dodecanethiol, benzenethiol, toluenethiol, α-toluenethiol, phenethylmercaptane, mercaptoethanol, 3-mercaptopropanol, thioglycerin, thioglycolic acid, 2-mercaptopropionic acid, 3-mercaptopropionic acid, α-mercaptoisobutyric acid, methyl mercaptopropionate, ethyl mercaptopropionate, thioacetic acid, thiomalic acid, thiosalicylic acid, octylmercaptane, n-dodecylmercaptane, tert-dodecylmercaptane, n-hexadecylmercaptane, n-tetradecylmercaptane, tert-tetradecylmercaptane and the like.

The vinyl polymer (A) of the invention may also be obtained by continuous polymerization at a temperature range of 180° C. to 350° C. using a stirred tank type reactor. A highly pure polymer is obtained by this polymerization method because it yields a vinyl polymer with a relatively low molecular weight while using effectively no polymerization initiator or chain transfer agent, which is advantageous from the standpoint of discoloration and odor as discussed below. If the polymerization temperature is less than 180° C., the polymerization reaction requires a polymerization initiator or a large quantity of a chain transfer agent, and the resulting copolymer is liable to discoloration and undesirable odor. If the polymerization temperature exceeds 350° C., on the other hand, a decomposition reaction is likely to occur during the polymerization reaction, and there is a risk that a pressure-adhesive layer obtained from a pressure-sensitive adhesive composition containing the polymer will lose transparency due to discoloration of the resulting copolymers. Such a polymerization method also yields a vinyl polymer with a narrow molecular weight distribution range. A polymerization initiator may be used as desired, and may also be used in the amount of not more than about 1 mass % of the total monomers.

[Acrylic Pressure-Sensitive Adhesive Polymer (B)]

The acrylic pressure-sensitive adhesive polymer (B) may contain a (meth)acrylic acid ester compound as a principal monomer unit. The monomer units of the acrylic pressure-sensitive adhesive polymer (B) are explained below.

The acrylic pressure-sensitive adhesive polymer (B) may have a Tg in the range of −80° C. to 10° C. A Tg is at least −80° C. imparts adequate cohesive force to the pressure-sensitive adhesive, as well as good adhesiveness. On the other hand, a Tg of not more than 10° C. imparts good stress relaxation. The lower limit of the Tg is at least −70° C. for example, or at least −60° C., or at least −50° C., or at least −40° C., or at least −30° C., or at least −25° C. for example. The upper limit of the Tg is not more than 5° C. for example, or not more than 1° C. for example, or not more than 0° C. for example. The range of the Tg can be set by combining these upper and lower limits, and may be −70° C. to 10° C. for example, or −60° C. to 10° C., or −50° C. to 10° C., or −40° C. to 10° C., or −30° C. to 10° C., or −30° C. to 5° C. for example.

A pressure-sensitive adhesive composition with excellent heat resistance and low tackiness can be obtained by giving the acrylic pressure-sensitive adhesive polymer (B) a Tg of at least −30° C. for example, or at least −25° C., or at least −20° C., or at least −15° C., or at least −10° C. for example.

From the standpoint of obtaining adequate cohesive force and good adhesiveness, the acrylic pressure-sensitive adhesive polymer (B) may have a number-average molecular weight (Mn) of at least 100,000, such as at least 120,000, or at least 130,000, or at least 140,000, or at least 150,000 for example. However, handling may be difficult during manufacture if the number-average molecular weight is too high. Therefore, the upper limit may be not more than 500,000, or not more than 400,000 for example, or not more than 300,000 for example, or not more than 200,000 for example.

To impart good cohesive force, the weight-average molecular weight (Mw) of the acrylic pressure-sensitive adhesive polymer (B) may be at least 300,000, or at least 400,000, or at least 500,000 for example. A weight-average molecular weight (Mw) of at least 600,000 is desirable for further improving the heat resistance, and it may also be at least 700,000 for example, or at least 800,000 for example. However, since handling during manufacture may be difficult if the weight-average molecular weight is too high. Therefore, the upper limit may be not more than 3,000,000 for example, or not more than 2,000,000 for example, or not more than 1,000,000 for example.

The ration (Mw/Mn) of the weight-average molecular weight (Mw) to the (Mn) may be not more than 6.0 for example, or not more than 5.0, or not more than 4.5, or not more than 4.0, or not more than 3.8, or not more than 3.6 for example to make it easier to obtain adhesive strength. The number-average molecular weight (Mn) and weight-average molecular weight (Mw) here are standard polystyrene conversion values obtained by gel permeation chromatography (GPC), as the same manner as the vinyl polymer (A).

The acrylic pressure-sensitive adhesive polymer (B) may have one or two or more kinds of monomer units selected from the group consisting of the (meth)acrylic acid alkoxyalkyl esters and (meth)acrylic acid alkyl esters. With such a monomer unit, it is possible to obtain a flexible acrylic pressure-sensitive adhesive polymer with excellent pressure-sensitive adhesiveness, and also to obtain a pressure-sensitive adhesive layer with excellent heat resistance when a pressure-sensitive adhesive layer is formed from a pressure-sensitive adhesive composition that also contains the vinyl polymer (A) described above.

Examples of the (meth)acrylic acid alkoxyalkyl esters include (meth)acrylic acid alkoxyalkyl esters having $C_{2-8}$ alkoxyalkyl groups, such as methoxymethyl (meth)acrylate, ethoxymethyl (meth)acrylate, butoxymethyl (meth)acrylate, methoxyethyl (meth)acrylate, ethoxyethyl (meth)acrylate, butoxyethyl (meth)acrylate, methoxybutyl (meth)acrylate, ethoxybutyl (meth)acrylate and butoxybutyl (meth)acrylate, and a (meth)acrylic acid alkoxyalkyl ester having a $C_{2-4}$ alkoxyalkyl group can be used to facilitate segregation of the vinyl polymer (A). One or two or more of these (meth) acrylic acid alkoxyalkyl esters may be used.

When selecting a (meth)acrylic acid alkoxyalkyl ester, a compound that produces monomer units with a solubility parameter (SP value) of at least 9.9 of the homopolymer can be used. If the SP value is at least 9.9, the vinyl polymer (A) can be segregated more easily in the surface layer of the resulting pressure-sensitive adhesive layer. Examples include methoxyethyl acrylate (SP value: 10.2) and ethoxyethyl acrylate (SP value: 10.0). The SP value can be calculated by a person skilled in the art by the Fedors method.

The amount of the (meth)acrylic acid alkoxyalkyl ester used is not particularly limited, but the lower limit may be at least 10 mass %, or at least 15 mass %, or at least 20 mass %, or at least 25 mass %, or at least 30 mass %, or at least 40 mass %, or at least 50 mass %, or at least 60 mass %, or at least 70 mass %, or at least 80 mass % or at least 90 mass % for example of the total monomer units constituting the acrylic pressure-sensitive adhesive polymer (B) in order to facilitate segregation of the vinyl polymer (A) in the surface layer when forming the pressure-sensitive adhesive layer, and obtain good pressure-sensitive adhesive performance. The upper limit may be 99 mass %, or not more than 95 mass %, or not more than 90 mass %, or not more than 80 mass %, or not more than 70 mass % for example. The range of the amount used may be set by combining these upper and lower limits, and may be 10 mass % to 95 mass %, or 20 mass % to 95 mass %, or 30 mass % to 70 mass %, or 40 mass % to 60 mass % for example.

Examples of the (meth)acrylic acid alkyl esters having alkyl groups include methyl (meth)acrylate, ethyl (meth)acrylate, n-propyl (meth)acrylate, isopropyl (meth)acrylate, n-butyl (meth)acrylate, isobutyl (meth)acrylate, n-hexyl (meth)acrylate, n-octyl (meth)acrylate, isooctyl (meth)acrylate, 2-ethylhexyl (meth)acrylate, n-nonyl (meth)acrylate, isononyl (meth)acrylate, n-decyl (meth)acrylate, lauryl (meth)acrylate and the like, and one or two or more of these may be used.

Of these, at least a (meth)acrylic acid alkyl ester having a $C_{1-3}$ alkyl group may be used. Such a (meth)acrylic acid alkyl ester is advantageous for increasing the Tg of the acrylic pressure-sensitive adhesive polymer (B) and improving the heat resistance of the pressure-sensitive adhesive layer. A (meth)acrylic acid alkyl ester having a $C_{1-2}$ alkyl group is preferred, and a (meth)acrylic acid methyl ester is more preferred.

When selecting such a (meth)acrylic acid alkyl ester, a compound that produces monomer units with a solubility parameter (SP value) of at least 9.9 of the homopolymer can be used as in the previous case. Examples include methyl acrylate (SP value: 10.6), ethyl acrylate (SP value: 10.2) and methyl methacrylate (SP value: 9.9). If the SP value is at least 9.9, the vinyl polymer (A) can be segregated more easily in the surface layer of the resulting pressure-sensitive adhesive layer.

The amount of this (meth)acrylic acid alkyl ester having a $C_{1-3}$ alkyl group that is used is not particularly limited, but from the perspective of increasing the Tg of the acrylic pressure-sensitive adhesive polymer (B) and facilitating segregation of the vinyl polymer (A) in the surface layer of the resulting pressure-sensitive adhesive layer, the lower limit may be at least 10 mass %, or at least 15 mass %, or at least 20 mass %, or at least 25 mass %, or at least 30 mass %, or at least 35 mass %, or at least 40 mass %, or at least 50 mass %, or at least 60 mass %, or at least 70 mass %, or at least 80 mass % or at least 90 mass % for example of the total monomer units. The upper limit may be 99 mass %, or not more than 95 mass %, or not more than 90 mass %, or not more than 80 mass %, or not more than 70 mass % for example. The range of the amount used may be set by combining these upper and lower limits, and may be 10 mass % to 99 mass %, or 20 mass % to 95 mass %, or 20 mass % to 85 mass %, or 20 mass % to 70 mass %, or 30 mass % to 60 mass % for example.

To more easily segregate the vinyl polymer (A) in the surface layer of the resulting pressure-sensitive adhesive layer, at least one kind of compound selected from the group consisting of the (meth)acrylic acid alkoxyalkyl esters having $C_{2-4}$ alkoxyalkyl groups and the (meth)acrylic acid alkyl esters having $C_{1-3}$ alkyl groups may be included in the amount of at least 10 mass % of the total monomer units constituting the acrylic pressure-sensitive adhesive polymer (B). For example, the lower limit may be at least 15 mass %, or at least 20 mass %, or at least 25 mass %, or at least 30 mass %, or at least 35 mass %, or at least 40 mass % or at least 50 mass %, or at least 60 mass % or at least 70 mass %, or at least 80 mass % or at least 90 mass % for example of the total monomer units. The upper limit may be 99 mass %, or not more than 95 mass %, or not more than 90 mass % or not more than 80 mass %, or not more than 70 mass % for example. The range of the amount used may be set by combining these upper and lower limits, and may be 10 mass % to 99 mass %, or 20 mass % to 95 mass %, or 20 mass % to 85 mass %, or 20 mass % to 70 mass %, or 30 mass % to 60 mass % for example.

A (meth)acrylic acid alkyl ester having a $C_{4-8}$ alkyl group may also be used. Using such a (meth)acrylic acid alkyl ester is advantageous for reducing the Tg of the acrylic pressure-sensitive adhesive polymer (B) and imparting stress relaxation properties to the pressure-sensitive adhesive layer. A (meth)acrylic acid alkyl ester having a $C_{4-6}$ alkyl group is preferred, a (meth)acrylic acid alkyl ester having a $C_{4-5}$ alkyl group is more preferred, and a (meth)acrylic acid alkyl ester having an alkyl group with 4 carbon atoms is still more preferred.

The amount of this (meth)acrylic acid alkyl ester having a $C_{4-8}$ alkyl group that is used is not particularly limited, but considering the stress relaxation properties of the pressure-sensitive adhesive layer and the like, the lower limit thereof may be at least 10 mass %, or at least 15 mass %, or at least 25 mass %, or at least 30 mass %, or at least 35 mass %, or at least 40 mass %, or at least 50 mass %, or at least 60 mass %, or at least 70 mass % for example of the total monomer units. The upper limit may be not more than 90 mass %, or not more than 80 mass %, or not more than 75 mass %, or not more than 70 mass % or not more than 65 mass %, or not more than 60 mass % for example. The range of the amount used may be set by combining these upper and lower limits, and may be 10 mass % to 90 mass %, or 10 mass % to 85 mass %, or 15 mass % to 80 mass %, or 15 mass % to 50 mass %, or 30 mass % to 60 mass % for example.

The acrylic pressure-sensitive adhesive polymer (B) may be provided with one or two or more kinds of monomer units selected from the group consisting of the (meth)acrylic acid alkoxyalkyl esters and (meth) acrylic acid alkyl esters in the amount of at least 80 mass % of the total monomer units. This makes it possible to obtain a highly heat-resistance pressure-sensitive adhesive layer. This amount may also be at least 85 mass %, or at least 90 mass % for example, and not more than 99 mass %, or not more than 95 mass % for example. The range of the amount used may be set by combining these upper and lower limits, and may be 80 mass % to 99 mass % for example, or 85 mass % to 95 mass % for example.

The acrylic pressure-sensitive adhesive polymer (B) may also use another copolymerizable monomer unit other than a (meth)acrylic acid alkoxyalkyl alkyl and (meth)acrylic acid alkyl ester to the extent that this does not detract from the effects of the pressure-sensitive adhesive composition. Examples of copolymerizable monomers include polyalkylene glycol mono(meth)acrylates, as well as other vinyl monomers.

Examples of the polyalkylene glycol mono(meth)acrylates include polyethylene glycol mono(meth)acrylate, methoxypolyethylene glycol mono(meth)acrylate, polypropylene glycol mono(meth)acrylate, methoxypolypropylene glycol mono(meth)acrylate, polyethylene glycol-polypropylene-glycol mono(meth)acrylate and the like, and one or two or more of these may be used.

Examples of the other vinyl monomers include α,β-ethylenically unsaturated carboxylic acid monomers such as (meth)acrylic acid, itaconic acid, maleic acid and fumaric acid; aromatic vinyl compounds such as styrene, α-methylstyrene and vinyl toluene; alicyclic vinyl compounds such as cyclohexyl (meth)acrylate, methyl cyclohexyl (meth)acrylate, t-butyl cyclohexyl (meth)acrylate, cyclododecyl (meth)acrylate and isobornyl (meth)acrylate; monoalkyl esters of unsaturated dicarboxylic acids, such as itaconic acid mono-ethyl ester and fumaric acid monobutyl ester; hydroxyl group-containing monomers such as 2-hydroxyethyl (meth) acrylate. 3-hydroxypropyl (meth)acrylate, 4-hydroxybutyl (meth)acrylate, polyethylene glycol (meth)acrylate, polypropylene glycol (meth)acrylate and polyethylene-polypropylene glycol mono(meth)acrylate; ethylenically unsaturated carboxylic acid amides and N-substituted compounds, such as acrylamide, N-methylol acrylamide, N-methoxymethyl acrylamide and N-methoxybutyl acrylamide; unsaturated alcohols such as allyl alcohol; and (meth)acrylonitrile, vinyl acetate, glycidyl (meth)acrylate and diacetone acrylamide, and one or two or more of these may be used.

The amount of the other monomer that is used may be in the range of 0 mass % to 10 mass %, and may also be 0.5 mass % to 8.0 mass %, or 1.0 mass % to 5.0 mass % for example.

As discussed above, a compound that produces monomer units with a solubility parameter (SP value) of at least 9.9 of the homopolymer is suitable for the acrylic pressure-sensitive adhesive polymer (B) because this facilitates segregation of the vinyl polymer (A) in the surface layer of the resulting pressure-sensitive adhesive layer. In the acrylic pressure-sensitive adhesive polymer (B), such a monomer can be used in the amount of at least 10 mass % for example, or at least 20 mass %, or at least 25 mass %, or at least 30 mass %, or at least 35 mass %, or at least 40 mass %, or at least 50 mass %, or at least 55 mass %, or at least 60 mass %, or at least 65 mass %, or at least 70 mass %, or at least 75 mass %, or at least 80 mass %, or at least 90 mass % for example of the total monomer units.

The solubility parameters (SP values) of principal monomers as determined by the Fedors method are given for example in Table 1.

TABLE 1

Calculation of SP values according to the Fedors Method

| | SP value of homopolymer [$(cal/cm^3)^{1/2}$] |
|---|---|
| Monomer with SP value of at least 9.9 of the homopolymer | |
| Methyl acrylate | 10.6 |
| Methyl methacrylate | 9.9 |
| Ethyl acrylate | 10.2 |
| Methoxyethyl acrylate | 10.2 |
| Ethoxyethyl acrylate | 10.0 |
| Hydroxyethyl acrylate | 14.5 |
| Hydroxyethyl methacrylate | 13.5 |
| Acryloyl morpholine | 13.9 |
| Acrylic acid | 14.0 |
| Methacrylic acid | 12.5 |
| Styrene | 10.2 |
| Benzyl methacrylate | 10.8 |
| Monomer with SP value of less than 9.9 of the homopolymer | |
| Butyl acrylate | 9.8 |
| 2-ethylhexyl acrylate | 9.3 |

The acrylic pressure-sensitive adhesive polymer (B) may also be obtained by a known radical polymerization method such as solution polymerization, suspension polymerization or emulsion polymerization.

[Pressure-Sensitive Adhesive Composition]

The pressure-sensitive adhesive composition may contain the vinyl polymer (A) and the acrylic pressure-sensitive adhesive polymer (B) in predetermined compounding ratios. It is thus possible to segregate the vinyl polymer (A) in the surface layer when obtaining a pressure-sensitive adhesive layer from the pressure-sensitive adhesive composition, to thereby increase the Tg near the surface of the pressure-sensitive adhesive layer and obtain good heat resistance and adhesive strength. This segregation behavior of the vinyl polymer (A) and the Tg difference between the surface layer of the pressure-sensitive adhesive layer and the pressure-sensitive adhesive layer as a whole (discussed below) can both be adjusted by appropriately setting the compounding ratio of the vinyl polymer (A) relative to the acrylic pressure-sensitive adhesive polymer (B), the monomer composition (polarity) and molecular weight of the vinyl polymer (A), and the Tg, Mw/Mn and the like.

This pressure-sensitive adhesive composition may contain the vinyl polymer (A) in the amount of 0.5 mass parts to 60 mass parts per 100 mass parts of the acrylic pressure-sensitive adhesive polymer (B) converted to solid content. Durability is improved and the effect of suppressing lifting and peeling after heating and moist heating tends to be satisfactory if the amount of the vinyl polymer (A) is at least 0.5 mass parts, while a highly transparent pressure-sensitive adhesive layer can be obtained if it is not more than 60 mass parts.

Although not particularly limited, the minimum amount of the vinyl polymer (A) may be at least 0.8 mass parts, or at least 1.0 mass parts, or at least 2.0 mass parts, or at least 5.0 mass parts, or at least 6.0 mass parts, or at least 8.0 mass parts, or at least 10 mass parts, or at least 15 mass parts for example. The maximum amount may be not more than 50 mass parts, or not more than 40 mass parts, or not more than 30 mass parts, or not more than 25 mass parts for example. The range of the amount may be set by combining these upper and lower limits, and may be 1.0 to 40 mass parts, or 1.5 to 30 mass parts, or 1.0 to 25 mass parts, or 1.0 to 20 mass parts for example.

As discussed below, a pressure-sensitive adhesive composition with low tackiness and excellent heat resistance can be obtained if the amount of the vinyl polymer (A) used is at least 10 mass parts. Although this is not a particular limitation, heat resistance, pressure-sensitive adhesiveness and low tackiness can be obtained if the compounded amount of the vinyl polymer (A) is at least 10 mass parts per 100 mass parts of the acrylic pressure-sensitive adhesive polymer (B).

When the pressure-sensitive adhesive composition is coated on a separator and dried to obtain a pressure-sensitive adhesive layer, the glass transition temperature of the pressure-sensitive adhesive layer as a whole (first Tg) may be −80° C. to 10° C. Within this range, good pressure-sensitive adhesive performance can be obtained. The lower limit of the first Tg may be at least −70° C., or at least −60° C., or at least −50° C., or at least −40° C., or at least −30° C., or at least −20° C. for example. The upper limit of the first Tg may be not more than 5° C., or not more than 4° C., or not more than 3° C., or not more than 2° C., or not more than 1° C., or not more than 0° C. for example. The range of the first Tg may be set by combining these upper and lower limits, and may be −70° C. to 10° C., or −50° C. to 10° C., or −40° C. to 5° C., or −30° C. to 5° C., or −25° C. to 5° C., or −25° C. to 1° C., or −20° C. to 1° C., or −20° C. to 0° C. for example.

The glass transition temperature of the pressure-sensitive adhesive layer as a whole is a glass transition temperature obtained by known methods from a sample that is a pressure-sensitive adhesive layer obtained from a pressure-sensitive adhesive composition containing the vinyl polymer (A) and acrylic pressure-sensitive adhesive polymer (B).

The conditions for coating, drying and the like when preparing the pressure-sensitive adhesive layer may conform to the examples described below.

When the pressure-sensitive adhesive composition is coated on a separator and dried to obtain a pressure-sensitive adhesive layer, the glass transition temperature calculated from the surface layer part based on X-ray photoelectron spectroscopy (XPS) of the pressure-sensitive adhesive layer (second Tg) may be at least 40° C. Good heat resistance can be ensured if it is at least 40° C. The lower limit of the second Tg may also be at least 50° C., or at least 60° C., or at least 70° C., or at least 75° C., or at least 80° C., or at least 85° C. for example. The lower limit of the second Tg is not particularly limited, but may be not more than 120° C., or not more than 90° C. for example. The range of the second Tg may be set by combining these upper and lower limits, and may to 50° C. to 120° C., or 50° C. to 90° C., or 60° C. to 90° C., or 70° C. to 90° C. for example.

The second Tg obtained from the pressure-sensitive adhesive composition is preferably at least 30° C. higher than the first Tg. That is, the difference between the second Tg and the first Tg is preferably at least 30° C. With this temperature difference, it is possible to ensure adequate heat resistance and pressure-sensitive adhesiveness. The difference may also be at least 40° C., or at least 50° C., or at least 60° C., or at least 70° C., or at least 75° C., or at least 80° C., or at least 85° C. for example. The upper limit of the difference is not particularly limited, but is generally not more than 200° C., or not more than 120° C. for example, or not more than 110° C. for example, or not more than 100° C. for example.

The second Tg as calculated from the composition of the surface layer part is determined by calculating from the compositional ratios of the vinyl polymer (A) and the acrylic pressure-sensitive adhesive polymer (B) according to X-ray photoelectron spectroscopy (XPS). In XPS, photoelectrons generated by exposing the surface of the pressure-sensitive adhesive layer to X-rays are detected, and compositional data can be obtained from the physical energy of these photoelectrons. Because photoelectrons generated in layers below the surface lose their physical energy before reaching the surface, the detection depth of XPS is a few nanometers. Thus, XPS can yield compositional data about the surface layer part within a few nanometers of the surface of the pressure-sensitive adhesive layer, and the compositional ratios of the vinyl polymer (A) and acrylic pressure-sensitive adhesive polymer (B) can be determined based on this compositional data, and used to calculate the Tg. The specific XPS measurement conditions and Tg calculation methods and the like are described in the examples below.

A pressure-sensitive adhesive sheet including a 50 μm-thick pressure-sensitive adhesive layer of the pressure-sensitive adhesive composition on a 100 μm-thick polyethylene terephthalate film substrate may have a pressure-sensitive adhesive strength (peeling strength) of at least 5.0 N/25 mm relative to a glass plate at 100° C. The adhesive strength here means the 180° peeling strength at a peeling rate of 300 mm/minute. If the adhesive strength to a glass plate at 100° C. is at least 5.0 N/25 mm, durability on a glass plate under high-temperature, high-humidity conditions can be said to be improved. The adhesive strength may also be at least 7.0 N/25 mm for example, or at least 8.0 N/25 mm for example, or at least 10.0 N/25 mm for example, or at least 12.0 N/25 mm for example, or at least 15.0 N/25 mm for example.

The pressure-sensitive adhesive composition may also have an adhesive strength (peeling strength) of at least 0.5 N/25 mm of the pressure-sensitive adhesive sheet to a glass plate at 120° C. If the adhesive strength relative to a glass plate at 120° C. is at least 0.5 N/25 mm, durability on a glass plate under high-temperature, high-humidity conditions can be said to be improved. This adhesive strength may also be also be at least 0.6 N/25 mm, or may be at least 0.7 N/25 mm, or at least 0.8 N/25 mm, or at least 1.0 N/25 mm, or at least 1.5 N/25 mm, or at least 2.0 N/25 mm, or at least 3.0 N/25 mm, or at least 4.0 N/25 mm for example.

When preparing the pressure-sensitive adhesive sheet, either a method of coating the pressure-sensitive adhesive composition directly on the polyethylene terephthalate film substrate and drying it to obtain a pressure-sensitive adhesive sheet, or a method of first coating the composition on release paper and then transferring it to the polyethylene terephthalate film substrate may be adopted. Drying may be performed at room temperature, but from the standpoint of productivity and the like, a method of drying for several seconds to several ten minutes in a dryer under heating conditions of 40° C. to 150° C. is normal. More specific coating and drying conditions and the like are described in the examples.

Adhesive strength is measured in accordance with JIS Z 0237 "Testing methods of pressure-sensitive adhesive tapes and sheets", and adhesive strength relative to the glass plate is measured under the conditions described below in the columns of the examples.

The pressure-sensitive adhesive composition may also have good bubbling resistance. To test bubbling resistance, for example a 100 μm-thick easy adhesion-treated PET film is affixed to one side of the pressure-sensitive adhesive sheet, and a polycarbonate plate affixed to the other side to prepare a laminated body, and this laminated body is crimped at 50° C., 0.5 MPa for 20 minutes. This laminated body is then subjected to conditions of 24 hours at 85° C./85% RH in a thermostatic tank, or either 24 hours at 100° C. or 20 minutes at 120° C. with an air dryer, and the external appearance (presence or absence of bubbling) is confirmed visually and evaluated. The appearance can then be evaluated as no change in external appearance, bubbling area not more than 10%, or bubbling area more than 10% of test piece area or the like. With this pressure-sensitive adhesive composition, good bubbling resistance (no change in external appearance) can be obtained in all cases under conditions of 24 hours at 100° C. for example, and good bubbling resistance (no peeling or bubbling area not more than 10%) can also be obtained under conditions of 20 minutes at 120° C. for example.

As discussed above, tackiness can be easily controlled with the pressure-sensitive adhesive composition. For example, low tackiness can be achieved by having the compounded amount of the vinyl polymer (A) be at least 10 mass parts per 100 mass parts of the acrylic pressure-sensitive adhesive polymer (B), or by having the Tg of the acrylic pressure-sensitive adhesive polymer (B) be at least −30° C. for example. The tackiness of the pressure-sensitive adhesive composition can be evaluating by evaluating the pressure-sensitive adhesive sheet in accordance with JIS Z 0237. The rolling ball tack number obtained by JIS Z 0237 may be not more than 3 for example, or not more than 2 for example.

The method for mixing the pressure-sensitive adhesive composition is not particularly limited as long as the composition contains the specified amounts of the vinyl polymer (A) and acrylic pressure-sensitive adhesive polymer (B), and may be a method of mixing the vinyl polymer (A) and acrylic pressure-sensitive adhesive polymer (B) for example, or a method of polymerizing the acrylic pressure-sensitive adhesive polymer (B) in the presence of the vinyl polymer (A).

The pressure-sensitive adhesive composition of the invention may also be a composition containing additives such as a crosslinking agent (curing agent), tackifier, plasticizer, anti-oxidant, UV absorber, anti-aging agent, flame retardant, fungicide, silane coupling agent, filler, colorant or the like as necessary in addition to the vinyl polymer (A) and acrylic pressure-sensitive adhesive polymer (B).

Examples of the crosslinking agent (curing agent) include glycidyl compounds having two or more glycidyl groups, isocyanate compounds having two or more isocyanate groups, aziridine compounds having two or more aziridine groups, oxazoline compounds having oxazoline groups, metal chelate compounds, butylated melamine compounds and the like. Of these, an aziridine compound, glycidyl compound or isocyanate compound may be used. Of these, an isocyanate compound is preferred for obtaining superior pressure-sensitive adhesiveness under high-temperature conditions.

Examples of the aziridine compounds include 1,6-bis(1-aziridinylcarbonylamino)hexane, 1,1'-(methylene-di-p-phenylene)bis-3,3-aziridyl urea, 1,1'-(hexamethylene)bis-3,3-aziridyl urea, ethylenebis-(2-aziridinylpropionate), tris(1-aziridinyl)phosphine oxide, 2,4,6-triaziridinyl-1,3,5-triazine, trimethylolpropane-tris-(2-aziridinylpropionate) and the like.

Examples of the glycidyl compounds include polyfunctional glycidyl compounds such as ethylene glycol diglycidyl ether, polyethylene glycol diglycidyl ether, propylene glycol diglycidyl ether, polypropylene glycol diglycidyl ether, glycerin diglycidyl ether, neopentyl glycol diglycidyl ether, 1,6-hexanediol diglycidyl ether, tetraglycidyl xylene diamine, 1,3-bis(N,N-diglycidylaminomethyl)cyclohexane, trimethylolpropane polyglycidyl ether, diglycerol polyglycidyl ether, polyglycerol polyglycidyl ether and sorbitol polyglycidyl ether.

Examples of the isocyanate compounds include compounds having two or more isocyanate groups for example.

Various aromatic, aliphatic and alicyclic isocyanate compounds as well as modified forms of these isocyanate compounds (prepolymers and the like) may be used as these isocyanate compounds.

Examples of the aromatic isocyanates include diphenylmethane diisocyanate (MDI), crude diphenylmethane diisocyanate, tolylene diisocyanate, naphthalene diisocyanate (NDI), p-phenylene diisocyanate (PPDI), xylene diisocyanate (XDI), tetramethylxylylene diisocyanate (TMXDI), tolidine diisocyanate (TODI) and the like.

Examples of the aliphatic isocyanates include hexamethylene diisocyanate (HDI), lysine diisocyanate (LDI), lysine triisocyanate (LTI) and the like.

Examples of the alicyclic isocyanates include isophorone diisocyanate (IPDI), cyclohexyl diisocyanate (CHDI), hydrogenated XDI (H6XDI), hydrogenated MDI (H12MDI) and the like.

Examples of modified isocyanates include urethane modified products, dimers, trimers, carbodiimide modified products, allophanate modified products, biuret modified products, urea modified products, isocyanurate modified products, oxazolidone modified products, and isocyanate-terminated prepolymers of these isocyanate compounds and the like.

When the pressure-sensitive adhesive composition of the invention contains a crosslinking agent (curing agent), the content thereof may be 0.01 mass parts to 10 mass parts per 100 mass parts of the acrylic pressure-sensitive adhesive polymer (B). The content may also be 0.03 mass parts to 5 mass parts, or 0.05 mass parts to 2 mass parts.

Examples of the tackifier include rosin derivatives such as rosin esters, gum rosin, tall oil rosin, hydrogenated rosin esters, maleated rosin and disproportionated rosin esters; terpene resins consisting primarily of terpene phenolic resin, α-pinene, β-pinene, limonene and the like; and (hydrogenated) petroleum resins, coumarone-indene resins, hydrogenated aromatic copolymers, styrene resins, phenol resins, xylene resins, (meth)acrylic polymers and the like.

Examples of the plasticizer include phthalate esters such as di-n-butyl phthalate, di-n-octyl phthalate, bis(2-ethylhexyl)phthalate, di-n-decyl phthalate and diisodecyl phthalate; adipate esters such as bis(2-ethylhexyl)adipate and di-n-octyl adipate; sebacic acid esters such as bis(2-ethylhexyl)sebacate and di-n-butyl sebacate; azelaic acid esters such as bis(2-ethylhexyl)azelate; paraffins such as chlorinated paraffin; glycols such as polypropylene glycol; epoxy-modified vegetable oils such as epoxidized soybean oil and epoxidized linseed oil; phosphate esters such as trioctyl phosphate and triphenyl phosphate; phosphite esters such as triphenyl phosphite; ester oligomers such as esterified products of adipic acid and 1,3-butylene glycol; low-molecular-weight polymers such as low-molecular-weight polybutene, low-molecular-weight polyisobutylene and low-molecular-weight polyisoprene; and oils such as process oil, naphthene oil and the like.

Examples of the anti-oxidant include phenolic anti-oxidants such as 2,6-di-tert-butyl-p-cresol, butylated hydroxyanisole, 2,6-di-tert-butyl-4-ethylphenol, stearyl-β-(3,5-di-tert-butyl-4-hydroxyphenyl)propionate, 2,2'-methylenebis(4-methyl-6-tert-butylphenol), 2,2'-methylenebis(4-ethyl-6-tert-butylphenol), 4,4'-thiobis(3-methyl-6-tert-butylphenol), 4,4'-butylidenebis(3-methyl-6-tert-butylphenol), 3,9-bis[1,1-dimethyl-2-[β-(3-tert-butyl-4-hydroxy-5-methylphenyl)propionyloxy]ethyl]2,4,8,10-tetraoxaspiro[5,5]undecane, 1,3-tris(2-methyl-4-hydroxy-5-tert-butylphenyl)butane, 1,3,5-trimethyl-2,4,6-tris(3,5-di-tert-butyl-4-hydroxybenzyl)benzene, tetrakis-[methylene-3-(3',5'-di-tert-butyl-4'-hydroxyphenyl)propionato]methane, bis[3,3'-bis-(4'-hydroxy-3'-tert-butylphenyl)butyric acid]glycol ester, 1,3,5-tris(3',5'-di-tert-butyl-4'-hydroxybenzyl)-S-triazine-2,4,6-(1H,3H,5H) trione and tocopherols; sulfur-based anti-oxidants such as dilauryl-3,3'-thiodipropionate, dimyristyl-3,3'-thiodipropionate and stearyl-3,3'-thiodipropionate; and phosphorus-based anti-oxidants such as triphenyl phosphite, diphenyl isodecyl phosphite, 4,4'-butylidene-bis(3-methyl-6-tert-butylphenylditridecyl)phosphite, cyclic neopentane tetraylbis(octadecyl phosphite), tris(nonylphenyl) phosphite, tris (mononyphenyl) phosphite, tris(dinonylphenyl) phosphite, diisodecyl pentaerythritol diphosphite, 9,10-dihydro-9-oxa-10-phosphaphenanthrene-10-oxide, 10-(3,5-di-tert-butyl-4-hydroxybenzyl)-9,10-dihydro-9-oxa-10-phosphaphenanthrene-10-oxide, 10-decyloxy-9,10-dihydro-9-oxa-10-phosphaphenanthrene, tris(2,4-di-tert-butylphenyl) phosphite, cyclic neopentane tetraylbis(2,4-di-tert-butylphenyl) phosphite, cyclic neopentane tetraylbis(2,6-di-tert-butyl-4-methylphenyl) phosphite, 2,2-methylenebis(4,6-di-tert-butylphenyl) octylphosphite and the like.

Examples of the UV absorber include salicylate UV absorbers such as phenyl salicylate, p-tert-butylphenyl salicylate and p-octylphenyl salicylate; benzophenone UV absorbers such as 2,4-dihydroxybenzophenone, 2-hydroxy-4-methoxybenzophenone, 2-hydroxy-4-octoxybenzophenone, 2-hydroxy-4-dodecyloxybenzophenone, 2,2'-dihydroxy-4-methoxybenzophenone, 2,2'-dihydroxy-4,4'-dimethoxybenzophenone, 2-hydroxy-4-methoxy-5-sulfobenzophenone and bis(2-methoxy-4-hydroxy-5-benzoylphenyl) methane; benzotriazole UV absorbers such as 2-(2'-hydroxy-5'-methylphenyl) benzotriazole, 2-(2'-hydroxy-5'-tert-butylphenyl) benzotriazole, 2-(2'-hydroxy-3', 5'-di-tert-butylphenyl) benzotriazole, 2-(2'-hydroxy-3'-tert-butyl-5'-methylphenyl)-5-chlorobenzotriazole, 2-(2'-hydroxy-3',5'-di-tert-butylphenyl)-5-chlorobenzotriazole, 2-(2'-hydroxy-3',5'-di-tert-amylphenyl) benzotriazole, 2-(2'-hydroxy-4'-octoxyphenyl) benzotriazole, 2-[2'-hydoxy-3'-(3",4",5",6"-tetrahydrophthalimidomethyl)-5'-methylphenyl] benzotriazole, 2,2-methylenebis[4-(1,1,3,3-tetramethylbutyl)-6-(2H-benzotriazole-2-yl)phenol], 2-(2'-hydroxy-5'-methacryloxyphenyl)-2H-benzotriazole and 2,2'-methylenebis[4-(1,1,3,3-tetramethylbutyl)-6-(2H-benzotriazole-2-yl) phenol]; cyanoacrylate UV absorbers such as 2-ethylhexyl-2-cyano-3,3'-diphenyl acrylate and ethyl-2-cyano-3,3'-diphenyl acrylate; and nickel UV absorbers such as nickel bis(octylphenyl) sulfide, [2,2'-thiobis(4-tert-octylphenolato)]-n-butylamine nickel, nickel complex-3,5-di-tert-butyl-4-hydroxybenzyl-phosphoric acid monoethylate and nickel-dibutyldithiocarbamate and the like.

Examples of the anti-aging agent include poly(2,2,4-trimethyl-1,2-dihydroquinoline), 6-ethoxy-1,2-dihydro-2,2, 4-trimethylquinoline, 1-(N-phenylamino)-naphthalene, styrenated diphenylamine, dialkyl diphenylamine, N,N'-diphenyl-p-phenylenediamine, N-phenyl-N'-isopropyl-p-phenylenediamine, N,N'-di-2-naphthyl-p-phenylenediamine, 2,6-di-tert-butyl-4-methylphenol, mono (α-methylbenzyl) phenol, di(α-methylbenzyl) phenol, tri(α-methylbenzyl) phenol, 2,2'-methylenebis(4-methyl-6-tert-butylphenol), 2,2'-methylenebis(4-ethyl-6-tert-butylphenol), 4,4'-butylidenebis(6-tert-butyl-3-methylphenol), 4,4'-thiobis(6-tert-butyl-3-methylphenol), 1,1-bis(4-hydroxyphenyl) cyclohexane, 2,5-di-tert-butylhydroquinone, 2,5-di-tert-amylhydroquinone, 2-mercaptobenzimidazole, 2-mercaptobenzimidazole zinc salt, 2-mercaptomethyl benzimidazole, dibutyl dithiocarbamate nickel, tris(nonylphenyl)phosphite, dilauryl thiodipropionate and distearyl thiodipropionate and the like.

Examples of the flame retardant include halogen flame retardants such as tetrabromobisphenol A, 2,2-bis(4-hydroxy-3,5-dibromophenyl) propane, hexabromobenzene, tris(2,3-dibromopropyl) isocyanurate, 2,2-bis(4-hydroxy-ethoxy-3,5-dibromophenyl) propane, decabromodiphenyl oxide, and halogen-containing polyphosphates; phosphorus-based flame retardants such as ammonium phosphate, tricresyl phosphate, triethyl phosphate, tris(β-chloroethyl) phosphate, tris-chloroethyl phosphate, tris-dichloropropyl phosphate, cresyl diphenyl phosphate, xylenyl diphenyl phosphate, acidic phosphate esters, and nitrogen-containing phosphorus compounds; inorganic flame retardants such as red phosphorus, tin oxide, antimony trioxide, zirconium hydroxide, barium metaborate, aluminum hydroxide and magnesium hydroxide; and siloxane flame retardants such as poly(dimethoxysiloxane), poly(diethoxysiloxane), poly(diphenoxysiloxane), poly(methoxyphenoxysiloxane), methyl silicate, ethyl silicate, phenyl silicate and the like.

Examples of the fungicide include benzimidazole, benzothiazole, trihaloallyl, triazole, organic nitrogen sulfur compounds and the like.

Examples of the silane coupling agent include vinyl triethoxysilane, vinyl tris(β-methoxyethoxy)silane, γ-methacyloxypropyl trimethoxysilane, vinyl triacetoxysilane, γ-glycidoxypropyl trimethoxysilane, γ-glycidoxypropyl triethoxysilane, β-(3,4-epoxycyclohexyl)ethyl trimethoxysilane, γ-chloropropyl methoxysilane, vinyl trichlorosilane, mercaptopropyl trimethoxysilane, γ-aminopropyl triethoxysilane, N-β(aminoethyl)-γ-aminopropyl trimethoxysilane and the like.

Examples of the filler include inorganic powder fillers such as calcium carbonate, titanium oxide, mica and talc; and fibrous fillers such as glass fiber, organic reinforcing fiber and the like.

The form of the pressure-sensitive adhesive composition of the invention is not especially limited as long as it contains the vinyl polymer (A) and acrylic pressure-sensitive adhesive polymer (B). For example, it may be in the form of a solvent-based pressure-sensitive adhesive composition dissolved in an organic solvent such as ethyl acetate, or an emulsion-type pressure-sensitive adhesive composition including the acrylic pressure-sensitive adhesive polymer and vinyl polymer dispersed in an aqueous medium.

In the case of such a solvent-based pressure-sensitive adhesive composition and emulsion-type pressure-sensitive adhesive composition, the medium (organic solvent, water or the like) normally constitutes 20 to 80 mass parts per 100 mass parts of the pressure-sensitive adhesive composition.

In the case of an emulsion-type pressure-sensitive adhesive, a stabilizer may also be compounded. Examples of this stabilizer include stabilizers for vinyl chloride, such as cadmium stearate, zinc stearate, barium stearate, calcium stearate, lead dibutyltin dilaurate, tris(nonylphenyl)phosphite, triphenyl phosphite and diphenyl isodecyl phosphite; organic tin stabilizers, such as di-n-octyltin bis(isooctylthioglycolate ester) salt, di-n-octyltin maleate polymer, di-n-octyltin dilaurate salt, di-n-octyltin maleate ester salt, di-n-butyltin bismaleate ester salt, di-n-butyltin maleate polymer, di-n-butyltin bis(octylthioglycolate ester) salt, di-n-butyltin β-mercaptopropionate polymer, di-n-butyltin dilaurate, di-n-methyltin bis(isooctylmercaptoacetate) salt, poly(thiobis-n-butyltin sulfide), monooctyltin tris(isooctylthioglycolate ester), dibutyltin maleate, di-n-butyltin malate-carboxylate, and di-n-butyltin maleate-mercaptide; lead stabilizers, such as tribasic lead sulfate, dibasic lead phosphite, basic lead sulfite, dibasic lead phthalate, lead silicate, dibasic lead stearate, and lead stearate; and metallic soap stabilizers, such as cadmium soap, zinc soap, barium soap, lead soap, complex metallic soap, and calcium stearate and the like.

Furthermore, the pressure-sensitive adhesive composition of the invention may also be used in the form of a so-called syrup-type photocurable pressure-sensitive adhesive composition that is cured by UV or other active energy rays, by including a monofunctional and/or polyfunctional (meth)acrylic acid monomer and a photopolymerization initiator in addition to the vinyl polymer (A) and acrylic pressure-sensitive adhesive polymer (B).

In the case of such a photocurable pressure-sensitive adhesive composition, the composition may also contain an organic solvent or the like, but normally it is used as a solvent-free composition containing no solvent.

Examples of the monofunctional (meth)acrylic acid monomer include (meth)acrylic acid alkyl esters having $C_{1-12}$ alkyl groups; (meth)acrylic acid esters having cyclic structures, such as cyclohexyl (meth)acrylate, dicyclopentyl (meth)acrylate and isobornyl (meth)acrylate; (meth)acrylic acid hydroxyalkyl esters such as hydroxyethyl (meth)acrylate, hydroxypropyl (meth)acrylate and hydroxybutyl (meth)acrylate; and (meth)acrylic acid and the like. One of these compounds alone or a combination of two or more kinds may be used.

Examples of the polyfunctional (meth)acrylic acid monomer include alkylene glycol di(meth)acrylates such as butanediol di(meth)acrylate and hexanediol di(meth)acrylate; di(meth)acrylates of polyalkylene glycols, such as triethylene glycol di(meth)acrylate; and trimethylolpropane tri(meth)acrylate and its ethylene oxide and/or propylene oxide denatured products, and pentaerythritol tri(meth)acrylate, pentaerythritol tetra(meth)acrylate and the like. Other examples include polymers (macromonomers) having (meth)acryloyl groups, such as polyurethane (meth)acrylates and polyisoprene (meth)acrylates. As examples of polyisoprene (meth)acrylates, specific compounds include an esterified product of 2-hydroxyethyl methacrylate with a maleic anhydride adduct of an isoprene polymer. One of these compounds alone or a combination of two or more kinds may be used.

Examples of the photopolymerization initiator include benzoin and its alkyl ethers, acetophenones, anthraquinones, thioxanthones, ketals, benzophenones, xanthones, acyl phosphine oxides, α-diketones and the like. A photosensitizer may also be included to increase sensitivity to active energy rays.

Examples of the photosensitizer include benzoic acid and amine photosensitizers. Two or more of these may also be combined. The amount of the photopolymerization initiator and photosensitizer used may be 0.01 mass parts to 10 mass parts per 100 mass parts of the monofunctional and/or polyfunctional (meth)acrylic acid monomer.

Apart from the photocurable pressure-sensitive adhesive composition described above, a composition containing the vinyl polymer (A), a monofunctional and/or polyfunctional (meth)acrylic acid monomer and a photopolymerization initiator may also be used as a photocurable adhesive composition. The acrylic pressure-sensitive adhesive polymer (B) may then be mixed as necessary with this photocurable adhesive composition.

The pressure-sensitive adhesive composition of the invention may be used favorably in various common pressure-sensitive adhesive products such as pressure-sensitive adhesive films, pressure-sensitive adhesive sheets, pressure-sensitive adhesive tapes, pressure-sensitive adhesive labels, pressure-sensitive tapes, surface protective films, surface protective tapes, masking tapes, electrical insulating tapes, laminates and the like, and in bonding applications when constituting various laminates such as optical films.

When applied to these common pressure-sensitive adhesive products, the pressure-sensitive adhesive composition of the invention may be first coated on one or both sides of various kinds of substrates, and dried or exposed to UV or other active energy rays to form a pressure-sensitive adhesive layer and obtain a pressure-sensitive adhesive products such as a pressure-sensitive adhesive sheet or pressure-sensitive adhesive tape. The composition may also be made into a molten state, applied to a substrate, and then dried to obtain a product having a pressure-sensitive adhesive layer. A paper, film, cloth, nonwoven cloth or metal foil or the like may be used as the substrate, and the pressure-sensitive adhesive composition may be coated directly on these substrates, or coated on a release paper or the like and dried before being transferred to the substrate. The thickness of the pressure-sensitive adhesive when formed into a pressure-sensitive adhesive sheet (dried film thickness) is selected depending on the application, but may normally be in the range of 1 to 300 μm, or 5 to 250 μm, or 10 to 200 μm.

By using a glass plate and/or transparent plastic plate as the substrate, it is possible to obtain a pressure-sensitive adhesive product including a glass plate and/or transparent plastic plate affixed to one or both sides of a pressure-sensitive adhesive layer. This pressure-sensitive adhesive product may be applied to various laminates including optical films. In this case as well, the pressure-sensitive adhesive composition may be coated directly on the substrate, or coated on a release paper or the like and dried before being transferred to the substrate.

Because the pressure-sensitive adhesive composition of the invention has excellent transparency and excellent peeling strength and bubbling resistance on various adherends under high-temperature conditions, it can be affixed favorably to displays such as touch panels, liquid crystal display devices, organic EL display devices and plasma display panels, and to various optical films used in these. It is also useful for bonding applications in electronic parts such as flexible printed circuit boards and the like.

EXAMPLES

The present invention is explained in detail below based on examples. However, the present invention is not limited to the following examples. In the explanations below, "parts" mean mass parts, and "%" means mass %.

The various analyses of the polymers obtained in the examples were performed by the methods described below.
<Solids>
About 1 g of measurement sample was weighed precisely (a), and dried in a blast drier at 155° C. for 30 minutes, after which the residue was measured (b), and the solids calculated by the following formula. A weighing bottle was used for measurement. Other operations conformed to JIS K 0067-1992 (test methods for loss and residue of chemical products).

Solids(%)=($b/a$)×100

<Molecular Weight Measurement>
Molecular weights were measured by GPC under the following conditions.
GPC: Tosoh Corporation (HLC-8120)
Columns: Tosoh Corporation (TSKgel-Super MP-M×4)
Sample concentration: 0.1%
Flow rate: 0.6 ml/min
Eluent: Tetrahydrofuran
Column temperature: 40° C.
Detector: Differential refractometer (RI)
Standard substance: Polystyrene
<Glass Transition Point (Tg)>
The Tg values of the vinyl polymer (A), acrylic pressure-sensitive adhesive polymer (B) and pressure-sensitive adhesive layer as a whole were measured by DSC under the following conditions.
DSC: TA Instruments (Q-100)
Ramp rate: 10° C./min
Measurement atmosphere: Nitrogen
<Polymer Composition>
The polymer composition was calculated from the monomer charge amounts and the monomer consumption according to GC measurement.
GC: Agilent Technologies (7820A GC System)
Detector: FID
Column: 100% dimethylsiloxane (CP-Sil 5CB), length 30 m, internal diameter 0.32 mm
Calculation method: Internal standard method
1. Synthesis of Vinyl Polymer Synthesis Example 1

Synthesis of Polymer A-1

A mixture consisting of 200 mass parts of butyl acetate and 0.9 mass parts of dimethyl-2,2'-azobis(2-methylpropionate) (Wako Pure Chemical Industries, Ltd., product name "V-601") was loaded into a 1-liter 4-necked flask, and thoroughly deaerated by bubbling with nitrogen gas, after which the internal temperature of the mixture was raised to 90° C. Separately, a mixture of 165 mass parts of methyl methacrylate (hereunder called "MMA"), 44 mass parts of isobornyl methacrylate (hereunder called "IBXMA"), 17 mass parts of V-601 and 90 mass parts of butyl acetate was dripped into the flask through a drop funnel over the course of 5 hours to perform polymerization. After completion of dripping, the polymerization solution was dripped into a mixed solution of 4,800 mass parts of methanol and 1,200 mass parts of distilled water to separate the vinyl polymer in the polymerization solution, and obtain a polymer A-1. The polymer composition of the resulting polymer A-1 as calculated from the charge amounts and the monomer consumption according to GC measurement was 80 mass % MMA and 20 mass % IBXMA, with a Mw of 6,700, a Mn of 4,370 and a Mw/Mn of 1.53. The Tg was 108° C. The composition and analysis results for the polymer A-1 are shown in Table 2.

Synthesis Example 2

Polymer A-2

A mixture consisting of 200 mass parts of butyl acetate and 0.6 mass parts of V-601 was loaded into a 1-liter 4-necked flask, and thoroughly deaerated by bubbling with nitrogen gas, after which the internal temperature of the mixture was raised to 90° C. Separately, a mixture of 165 mass parts of MMA, 43 mass parts of IBXMA, 11 mass parts of V-601 and 90 mass parts of butyl acetate was dripped into the flask through a drop funnel over the course of 5 hours to perform polymerization. After completion of dripping, the polymerization solution was dripped into a mixed solution of 4,800 mass parts of methanol and 1,200 mass parts of distilled water to separate the vinyl polymer in the polymerization solution, and obtain a polymer A-2. The composition and analysis results for the polymer A-2 are shown in Table 2.

Synthesis Example 3

Polymer A-3

A mixture consisting of 200 mass parts of butyl acetate and 4.1 mass parts of V-601 was loaded into a 1-liter 4-necked flask, and thoroughly deaerated by bubbling with nitrogen gas, after which the internal temperature of the mixture was raised to 90° C. Separately, a mixture of 168 mass parts of MMA, 83 mass parts of IBXMA, 78 mass parts of V-601 and 90 mass parts of butyl acetate was dripped into the flask through a drop funnel over the course of 5 hours to perform polymerization. After completion of dripping, the polymerization solution was dripped into a mixed solution of 4,800 mass parts of methanol and 1,200 mass parts of distilled water to separate the vinyl polymer in the polymerization solution, and obtain a polymer A-3. The composition and analysis results for the polymer A-3 are shown in Table 2.

Synthesis Example 4

Polymer A-4

A mixture consisting of 200 mass parts of butyl acetate and 0.9 mass parts of V-601 was loaded into a 1-liter 4-necked flask, and thoroughly deaerated by bubbling with nitrogen gas, after which the internal temperature of the mixture was raised to 90° C. Separately, a mixture of 60 mass parts of MMA, 166 mass parts of IBXMA, 18 mass parts of V-601 and 90 mass parts of butyl acetate was dripped into the flask through a drop funnel over the course of 5 hours to perform polymerization. After completion of dripping, the polymerization solution was dripped into a mixed solution of 4,800 mass parts of methanol and 1,200 mass parts of distilled water to separate the vinyl polymer in the polymerization solution, and obtain a polymer A-4. The composition and analysis results for the polymer A-4 are shown in Table 2.

Synthesis Example 5

Synthesis of Polymer A-5

A mixture consisting of 280 mass parts of butyl acetate and 0.3 mass parts of V-601 was loaded into a 1-liter 4-necked flask, and thoroughly deaerated by bubbling with nitrogen gas, after which the internal temperature of the mixture was raised to 90° C. Separately, a mixture of 233 mass parts of MMA, 26 mass parts of IBXMA, 5.1 mass parts of V-601 and 90 mass parts of butyl acetate was dripped into the flask through a drop funnel over the course of 5 hours to perform polymerization. After completion of dripping, the polymerization solution was dripped into 6,000 mass parts of hexane to separate the vinyl polymer in the polymerization solution, and obtain a polymer A-5. The composition and analysis results for the polymer A-5 are shown in Table 2.

Synthesis Example 6

Synthesis of Polymer A-6

A mixture consisting of 200 mass parts of butyl acetate and 6.2 mass parts of V-601 was loaded into a 1-liter 4-necked flask, and thoroughly deaerated by bubbling with nitrogen gas, after which the internal temperature of the mixture was raised to 90° C. Separately, a mixture of 114 mass parts of MMA, 140 mass parts of IBXMA, 110 mass parts of V-601 and 90 mass parts of butyl acetate was dripped into the flask through a drop funnel over the course of 5 hours to perform polymerization. After completion of dripping, the polymerization solution was dripped into a mixed solution of 4,800 mass parts of methanol and 1,200 mass parts of distilled water to separate the vinyl polymer in the polymerization solution, and obtain a polymer A-6. The composition and analysis results for the polymer A-6 are shown in Table 2.

Synthesis Example 7

Synthesis of Polymer A-7

A mixture consisting of 200 mass parts of butyl acetate and 1.8 mass parts of V-601 was loaded into a 1-liter 4-necked flask, and thoroughly deaerated by bubbling with nitrogen gas, after which the internal temperature of the mixture was raised to 90° C. Separately, a mixture of 155 mass parts of MMA, 55 mass parts of IBXMA, 35 mass parts of V-601 and 90 mass parts of butyl acetate was dripped into the flask through a drop funnel over the course of 5 hours to perform polymerization. After completion of dripping, the polymerization solution was dripped into a mixed solution of 4,200 mass parts of methanol and 1,800 mass parts of distilled water to separate the vinyl polymer in the polymerization solution, and obtain a polymer A-7. The composition and analysis results for the polymer A-7 are shown in Table 2.

2. Synthesis of Acrylic Pressure-Sensitive Adhesive Polymer

Synthesis Example 8

Synthesis of Polymer B-1

500 mass parts of methoxyethyl acrylate (hereunder called "MEA"), 27 mass parts of 2-hydroxyethyl acrylate (hereunder called "HEA") and 980 mass parts of ethyl acetate were loaded into a 3-liter 4-necked flask, and thoroughly deaerated by bubbling with nitrogen gas, after which the internal temperature of the mixture was raised to 75° C., and 0.25 mass parts of azobisvaleronitrile (hereunder called "V-65") were added to initiate polymerization. After 5 hours, ethyl acetate was added until the solids component was 30 mass %, to obtain an ethyl acetate solution of a polymer B-1. The resulting polymer B-1 consisted of 95 mass % MEA and 5 mass % HEA, and had a Mw of 520,000, a Mn of 116,000 and a Mw/Mn of 4.48. The composition and analysis results for the polymer B-1 are shown in Table 3.

Synthesis Example 9

Synthesis of Polymer B-2

413 mass parts of MEA, 27 mass parts of HEA, 90 mass parts of butyl acrylate (hereunder called "BA"), and 980 mass parts of ethyl acetate were loaded into a 3-liter 4-necked flask, and thoroughly deaerated by bubbling with nitrogen gas, after which the internal temperature of the mixture was raised to 75° C., and 0.25 mass parts of V-65 were added to initiate polymerization. After 5 hours, ethyl acetate was added until the solids component was 30 mass %, to obtain an ethyl acetate solution of a polymer B-2. The composition and analysis results for the polymer B-2 are shown in Table 3.

Synthesis Example 10

Synthesis of Polymer B-3

254 mass parts of MEA, 27 mass parts of HEA and 90 mass parts of BA were loaded into a 3-liter 4-necked flask, 159 mass parts of methyl acrylate (hereunder called "MA") and 980 mass parts of ethyl acetate were loaded into a 3-liter 4-necked flask, and this mixture was thoroughly deaerated by bubbling with nitrogen gas, after which the internal temperature of the mixture was raised to 75° C., and 0.20 mass parts of V-65 were added to initiate polymerization. After 5 hours, ethyl acetate was added until the solids component was 30 mass %, to obtain an ethyl acetate solution of a polymer B-3. The composition and analysis results for the polymer B-3 are shown in Table 3.

Synthesis Example 11

Synthesis of Polymer B-4

27 mass parts of HEA, 192 mass parts of BA, 330 mass parts of MA and 1,200 mass parts of ethyl acetate were loaded into a 3-liter 4-necked flask, and thoroughly deaerated by bubbling with nitrogen gas, after which the internal temperature of the mixture was raised to 75° C., and 0.23 mass parts of V-65 were added to initiate polymerization. After 5 hours, ethyl acetate was added until the solids component was 30 mass %, to obtain an ethyl acetate solution of a polymer B-4. The composition and analysis results for the polymer B-4 are shown in Table 3.

Synthesis Example 12

Synthesis of Polymer B-5

105 mass parts of MEA, 25 mass parts of HEA, 370 mass parts of BA and 930 mass parts of ethyl acetate were loaded into a 3-liter 4-necked flask, and thoroughly deaerated by bubbling with nitrogen gas, after which the internal temperature of the mixture was raised to 75° C., and 0.24 mass parts of V-65 were added to initiate polymerization. After 5 hours, ethyl acetate was added until the solids component was 30 mass %, to obtain an ethyl acetate solution of a polymer B-5. The composition and analysis results for the polymer B-5 are shown in Table 3.

Synthesis Example 13

Synthesis of Polymer B-6

20 mass parts of HEA, 140 mass parts of BA, 240 mass parts of MA and 600 mass parts of ethyl acetate were loaded into a 3-liter 4-necked flask, and thoroughly deaerated by bubbling with nitrogen gas, after which the internal temperature of the mixture was raised to 75° C., and 0.10 mass parts of V-65 were added to initiate polymerization. After 5 hours, ethyl acetate was added until the solids component was 30 mass %, to obtain an ethyl acetate solution of a polymer B-6. The composition and analysis results for the polymer B-6 are shown in Table 3.

TABLE 2

| | Composition (mass %) | | | | | |
|---|---|---|---|---|---|---|
| | MMA | IBXMA | Mn | Mw | Mw/Mn | Tg |
| Polymer A-1 | 80 | 20 | 4370 | 6700 | 1.53 | 108 |
| Polymer A-2 | 80 | 20 | 6050 | 9320 | 1.54 | 115 |
| Polymer A-3 | 67 | 33 | 2270 | 2970 | 1.31 | 77 |
| Polymer A-4 | 30 | 70 | 3560 | 6080 | 1.71 | 90 |
| Polymer A-5 | 90 | 10 | 12400 | 22500 | 1.81 | 130 |
| Polymer A-6 | 48 | 52 | 1200 | 2030 | 1.69 | 50 |
| Polymer A-7 | 78 | 22 | 2560 | 5500 | 2.15 | 68 |

TABLE 3

| | Composition (mass %) | | | | | | Mw/ | |
|---|---|---|---|---|---|---|---|---|
| | MEA | MA | BA | HEA | Mn | Mw | Mn | Tg |
| Polymer B-1 | 95 | | | 5 | 116000 | 520000 | 4.48 | −31 |
| Polymer B-2 | 78 | | 17 | 5 | 160000 | 572000 | 3.58 | −35 |
| Polymer B-3 | 48 | 30 | 17 | 5 | 138000 | 577000 | 4.18 | −21 |
| Polymer B-4 | | 60 | 35 | 5 | 149000 | 568000 | 3.81 | −7 |
| Polymer B-5 | 21 | | 74 | 5 | 120000 | 483000 | 4.03 | −41 |
| Polymer B-6 | | 60 | 35 | 5 | 174000 | 806000 | 4.63 | −7 |

3. Manufacture and Evaluation of Pressure-Sensitive Adhesive Composition

Example 1

The polymer (A-1) obtained in synthesis example 1 above was dissolved in ethyl acetate to prepare a polymer (A-1) solution with a solids concentration of 30 mass %. 2 mass parts of this polymer (A-1) solution were mixed with the 100 mass parts of the polymer B-1 solution and 0.16 mass parts of Takenate D-110N (solids concentration 75 mass %, Mitsui Chemicals, Inc.) to obtain a pressure-sensitive adhesive composition.

This pressure-sensitive adhesive composition was applied to a 38 μm-thick polyethylene terephthalate (hereunder "PET") separator to a dried thickness of 50 μm. The pressure-sensitive adhesive composition was then dried for 4 minutes at 80° C. to remove the ethyl acetate and perform a crosslinking reaction, a 38 μm-thick PET separator with a different peeling strength was affixed to the separator, and the composition was cured (aged) by being left for 5 days at 40° C. to obtain a pressure-sensitive adhesive film sample with separators on both sides.

The resulting pressure-sensitive adhesive film sample was subjected to various measurements and evaluations by the methods shown below. The results are shown in Table 4.

<Gel Fraction>

0.2 g of pressure-sensitive adhesive were collected from the pressure-sensitive adhesive film sample, and the initial weight of the pressure-sensitive adhesive was weighed. This pressure-sensitive adhesive was immersed in 50 g of ethyl acetate, and left for 16 hours at room temperature. This was then filtered with a 200 mesh wire mesh, and the residue remaining on the mesh was dried for 3 hours at 80° C., and weighed. A gel fraction attributable to the acrylic pressure-sensitive adhesive polymer (B) was calculated by the following formula from the initial weight and the weight of the residue.

Gel fraction (%)=(weight of residue)/[(initial weight)×(solids component of acrylic pressure-sensitive adhesive polymer (*B*))/(solids component of entire pressure-sensitive adhesive composition)]×100  [Math. 1]

<Transparency (Haze Value)>

The release film was peeled off the pressure-sensitive adhesive film sample, which was then transferred to a 1 mm-thick glass plate, and the other release film was peeled off. This was left standing for 1 day at 23° C., 50% RH, and the haze value was measured with a Nippon Denshoku Industries Co., Ltd. haze meter (model name "Haze Meter NDH2000") to evaluate transparency in the composition.

<Rolling Ball Tack>

Rolling ball tack was evaluated using the pressure-sensitive adhesive samples. Rolling ball tack was evaluated in accordance with JIS Z 0237.

<23° C. Peeling Strength on Glass>

The pressure-sensitive adhesive film sample was transferred to a 100 μm-thick easy adhesion-treated PET film, to obtain a pressure-sensitive adhesive sheet for evaluation. Using a glass plate (Asahi Glass Co., Ltd., Fabritech FL11A, 1 mm thick) as the adherend, the pressure-sensitive adhesive sheet for evaluation was affixed to the glass and pressed 3 times back and forth with a 2 kg roller, and the 180° peeling strength of the pressure-sensitive adhesive sheet was measured at 23° C. using a Strograph R-type tension tester with thermostat (Toyo Seiki Seisaku-sho, Ltd.) in accordance with JIS Z 0237 "Testing methods of pressure-sensitive adhesive tapes and sheets". The peeling speed was 300 mm/min.

<High-Temperature Peeling Strength on Glass>

The pressure-sensitive adhesive film sample was transferred to a 100 μm-thick easy adhesion-treated PET film, to obtain a pressure-sensitive adhesive sheet for evaluation. Using a glass plate (Asahi Glass Co., Ltd., Fabritech FL11A, 1 mm thick) as the adherend, the pressure-sensitive adhesive sheet for evaluation was affixed to the glass and crimped for 20 minutes at 0.5 MPa, 50° C. with a TBR-200 desktop pressure degasser (Chiyoda Electric, Co., Ltd.), and the 180° peeling strength of the pressure-sensitive adhesive sheet was measured at 85° C., 100° C. and 120° C. using a Strograph R-type tension tester with thermostat (Toyo Seiki Seisaku-sho, Ltd.) in accordance with JIS Z 0237 "Testing methods of pressure-sensitive adhesive tapes and sheets". The peeling speed was 300 mm/min.

<Tg of Surface Layer Part of Pressure-Sensitive Adhesive Layer>

The mass fractions ($w_A$ and $w_B$) of the vinyl polymer (A) and acrylic pressure-sensitive adhesive polymer (B) relative to the total amount of the vinyl polymer (A) and acrylic pressure-sensitive adhesive polymer (B) in the surface layer of the pressure-sensitive adhesive layer were calculated from the peak area ratios of O1s and C1s as measured by X-ray photoelectron spectroscopy (XPS) of the pressure-sensitive adhesive film sample, and the Tg of the surface layer part was calculated based on the FOX formula.

XPS measurement was performed under the following conditions.

Equipment: ULVAC-PHI, Inc. PHI5000 VersaProbe

X-rays: Al—Kα (1486.6 eV)

X-ray incidence angle on sample: 0° (angle to the normal of the sample measurement surface)

Photoelectron detection angle: 45° (angle to the normal of the sample measurement surface)

The specific methods for calculating the mass fractions are described below.

As shown by the following formula (1), the ratio of the number of oxygen atoms to the number of carbon atoms as calculated from the peak area ratios of O1s and C1s as measured by XPS is represented as the ratio of oxygen atoms to carbon atoms per unit weight of the surface layer of a pressure-sensitive adhesive layer formed from a pressure-sensitive adhesive composition including the vinyl polymer (A) and acrylic pressure-sensitive adhesive polymer (B):

[Math. 2]

$$\left(\frac{O}{C}\right)_{A+B} = \frac{\frac{(1-W_A)}{M_{w-B}} \times N_{O-B} + \frac{W_A}{M_{w-A}} \times N_{O-A}}{\frac{(1-W_A)}{M_{w-B}} \times N_{C-B} + \frac{W_A}{M_{w-A}} \times N_{C-A}} \quad (1)$$

wherein $(O/C)_{A+B}$ is the ratio of the number of oxygen atoms to the number of carbon atoms as calculated from the peak area ratios of O1s and C1s as determined by XPS measurement of the pressure-sensitive adhesive layer obtained by drying the pressure-sensitive adhesive composition, $W_A$ is the mass ratio of the vinyl polymer (A) relative to the combined amount of the vinyl polymer (A) and acrylic pressure-sensitive adhesive polymer (B), $M_{w-A}$ is the weighed average molecular weight of the total constituent monomers of the vinyl polymer (A), $M_{w-B}$ is the weighed average molecular weight of the total constituent monomers of the acrylic pressure-sensitive adhesive polymer (B), $N_{O-A}$ is the number of oxygen atoms contained in the average monomer structure of the total constituent monomers constituting the vinyl polymer (A), $N_{O-B}$ is the is the number of oxygen atoms contained in the average monomer structure of the total constituent monomers constituting the acrylic pressure-sensitive adhesive polymer (B), $N_{C-A}$ is the number of carbon atoms contained in the average monomer structure of the total constituent monomers constituting the vinyl polymer (A), and $N_{C-B}$ is the is the number of carbon atoms contained in the average monomer structure of the total constituent monomers constituting the acrylic pressure-sensitive adhesive polymer (B).

Moreover, the ratios of the number of carbon atoms to the number of oxygen atoms as calculated from the peak area ratios of O1s and C1s according to XPS measurement of films obtained by drying units of the vinyl polymer (A) and acrylic pressure-sensitive adhesive polymer (B), respectively, are given by the following formulae (2) and (3).

[Math. 3]

$$\left(\frac{O}{C}\right)_A = \frac{N_{O-A}}{N_{C-A}} \quad (2)$$

In formula (2), $(O/C)_A$ is the ratio of oxygen atoms to carbon atoms as calculated from the peak area ratios of O1s and C1s as determined by XPS measurement of a film obtained by drying the vinyl polymer (A).

[Math. 4]

$$\left(\frac{O}{C}\right)_B = \frac{N_{O-B}}{N_{C-B}} \quad (3)$$

In formula (3), $(O/C)_B$ is the ratio of oxygen atoms to carbon atoms as calculated from the peak area ratios of O1s and C1s as determined by XPS measurement of a film obtained by drying the acrylic pressure-sensitive adhesive polymer (B).

The mass ratio ($W_A$) of the vinyl polymer (A) relative to the combined amount of the vinyl polymer (A) and acrylic pressure-sensitive adhesive polymer (B) is calculated by the following formula (4), which is derived from the above equations (1) to (3).

[Math. 5]

$$\left(\frac{O}{C}\right)_{A+B} = \frac{\frac{(1-W_A)}{M_{w-B}} \times N_{C-B} \times \left(\frac{O}{C}\right)_B + \frac{W_A}{M_{w-A}} \times N_{C-A} \times \left(\frac{O}{C}\right)_A}{\frac{(1-W_A)}{M_{w-B}} \times N_{C-B} + \frac{W_A}{M_{w-A}} \times N_{C-A}} \quad (4)$$

Moreover, the mass ratio ($W_B$) of the acrylic pressure-sensitive adhesive polymer (B) is calculated from the following formula (5) using the value of $W_A$ determined above:

[Math. 6]

$$W_B = 1 - W_A \quad (5)$$

in which $W_B$ is the mass ratio of the acrylic pressure-sensitive adhesive polymer (B) relative to the combined amount of the vinyl polymer (A) and acrylic pressure-sensitive adhesive polymer (B).

The various components of the above formula (4) are shown below with reference to Example 1.

$(O/C)_{A+B}$: 0.340 (measured value)

$(O/C)_A$: 0.290 (measured value)

$(O/C)_B$: 0.474 (measured value)

$N_{C-A}$: 5×89.9 (mol %)+14×10.1 (mol %)=5.91 based on the number of carbon atoms (5) in 1 molecule of MMA, the number of carbon atoms (14) in 1 molecule of IBXMA, and the compositional ratio of the two $N_{C-B}$: 6×94.4 (mol %)+5×5.6 (mol %)=5.94 based on the number of carbon atoms (6) in 1 molecule of MEA, the number of carbon atoms (5) in 1 molecule of HEA, and the compositional ratio of the two $M_{w-A}$: 100×89.9 (mol %)+222×10.1 (mol %)=112.3 based on the molecular weight of MMA (100), the molecular weight of IBXMA (222) and the compositional ratio of the two $M_{w-B}$: 130×94.4 (mol %)+116×5.6 (mol %)=129.2 based on the molecular weight of MEA (130), the molecular weight of HEA (116), and the compositional ratio of the two These values were substituted into the formula (4) to obtain a $W_A$ of 0.703, while formula (5) yielded a $W_B$ of 0.297.

Next, the Tg of the surface layer part was calculated by the FOX formula represented by formula (6) below from the surface composition obtained by measurement, yielding a value of 52.5° C.

$$1/[Tg \text{ of surface layer part}](K) = W_A/Tg_A + W_B/Tg_B \quad (6)$$

In the formula, $Tg_A$ is the Tg of the vinyl polymer (A) (70.3° C.), and $Tg_B$ is the Tg of the acrylic pressure-sensitive adhesive polymer (B) (−31° C.).

<Bubbling Resistance>

A 100 μm-thick easy adhesion-treated PET film was affixed to one side of the pressure-sensitive adhesive film sample, and a polycarbonate plate affixed to the other side to prepare a laminated body, and this laminated body was pressure treated at 50° C., 0.5 MPa for 20 minutes. This laminated body was then subjected to conditions of 24 hours at 85° C./85% RH in a thermostatic tank, or either 24 hours at 100° C. or 20 minutes at 120° C. with an air dryer, and the external appearance (presence or absence of bubbling) was confirmed an evaluated visually.

◯: No change in external appearance

Δ: Area of bubbling not more than 10% of area of test piece

×: Area of bubbling more than 10% of area of test piece

Examples 2 to 8 and Comparative Examples 1 to 4

Pressure-sensitive adhesive compositions were obtained by changing the types and ratios of the acrylic pressure-sensitive adhesive polymer and vinyl polymer in Example 1 as shown in Tables 4 and 5, and measured as in Example 1. The results are shown in Tables 4 and 5.

TABLE 4

| | | Ex. 1 | Ex. 2 | Ex. 3 | Ex. 4 | Ex. 5 | Ex. 6 | Ex. 7 | Ex. 8 |
|---|---|---|---|---|---|---|---|---|---|
| Vinyl polymer (A) | A-1 | 2.0 | 8.0 | 6.0 | 8.0 | | | | 8.0 |
| | A-2 | | | | | 8.0 | | | |
| | A-3 | | | | | | 20.0 | | |
| | A-4 | | | | | | | 6.0 | |
| | A-5 | | | | | | | | |
| | A-6 | | | | | | | | |
| | A-7 | | | | | | | | |
| Acrylic polymer (B) | B-1 | 100.0 | | | | | | | |
| | B-2 | | 100.0 | | | | 100.0 | | |
| | B-3 | | | 100.0 | | | | | |
| | B-4 | | | | 100.0 | 100.0 | | | |
| | B-5 | | | | | | | 100.0 | |
| | B-6 | | | | | | | | 100.0 |
| Cross-linking agent | Takenate D-110N | 0.16 | 0.16 | 0.16 | 0.16 | 0.16 | 0.16 | 0.16 | 0.08 |
| Mass parts of cross-linking agent solids (parts)/100 mass parts of acrylic polymer | | 0.40 | 0.40 | 0.40 | 0.40 | 0.40 | 0.40 | 0.40 | 0.20 |
| Gel fraction (%) | | 70.1 | 70.3 | 76.7 | 79.9 | 81.9 | 81.6 | 81.8 | 74.3 |
| Haze (%) | | 0.5 | 0.7 | 0.6 | 0.6 | 0.7 | 0.8 | 0.6 | 0.7 |
| Tg of BP (° C.) | | −31.0 | −35.0 | −21.0 | −7.0 | −7.0 | −35.0 | −41.0 | −7.0 |
| Tg of TF (° C.) | | 108.0 | 108.0 | 108.0 | 108.0 | 115.0 | 77.0 | 90.0 | 108.0 |
| Surface concentration (wt %) of (A) by XPS | | 70.3 | 83.6 | 80.1 | 82.7 | 80.0 | 99.0 | 79.7 | 83.1 |
| (I) Tg of surface layer (° C.) | | 52.5 | 73.8 | 72.8 | 81.5 | 82.4 | 75.4 | 52.7 | 82.1 |
| (II) Tg of entire pressure-sensitive adhesive (° C.) | | −29.3 | −28.2 | −16.1 | −0.9 | −0.7 | −21.6 | −36.2 | −0.9 |
| (I)-(II) | | 81.8 | 102.0 | 88.9 | 82.4 | 83.1 | 97.0 | 88.9 | 83.0 |
| Rolling ball tack | Ball No. | 9 | 8 | 3 | ≤2 | ≤2 | ≤2 | 8 | ≤2 |
| Peeling strength (adherend: glass) | 23° C. | 9.5 | 6.3 | 1.5 | 0.9 | 0.7 | 0.8 | 7.7 | 0.8 |
| | 85° C. | 10.2 | 22.4 | 34.7 | 17.3 | 17.3 | 16.1 | 13.5 | 24.2 |
| | 100° C. | 5.4 | 11.6 | 19.1 | 10.8 | 11.6 | 8.4 | 7.1 | 15.7 |
| | 120° C. | 0.6 | 0.8 | 3.5 | 4.2 | 5.8 | 0.7 | 0.6 | 7.1 |
| Bubbling resistance (PET film/PC) | 85° C., 85% RH, 24 h | ○ | ○ | ○ | ○ | ○ | ○ | ○ | ○ |
| | 100° C., 24 h | ○ | ○ | ○ | ○ | ○ | ○ | ○ | ○ |
| | 120° C., 20 min | Δ | Δ | ○ | ○ | ○ | Δ | Δ | ○ |

*Ex.: Example

TABLE 5

| | | CE 1 | CE 2 | CE 3 | CE 4 |
|---|---|---|---|---|---|
| Vinyl polymer (A) | A-1 | | | | |
| | A-2 | | | | |
| | A-3 | | | | |
| | A-4 | | | | |
| | A-5 | | 10.0 | | |
| | A-6 | | | 6.0 | |
| | A-7 | | | | 8.0 |
| Acrylic polymer (B) | B-1 | | | | |
| | B-2 | 100.0 | 100.0 | 100.0 | |
| | B-3 | | | | |
| | B-4 | | | | 100.0 |
| | B-5 | | | | |
| | B-6 | | | | |
| Crosslinking agent | Takenate D-110N | 0.16 | 0.16 | 0.16 | 0.16 |
| Mass parts of crosslinking agent solids/100 mass parts of acrylic polymer | | 0.40 | 0.40 | 0.40 | 0.40 |
| Gel fraction (%) | | 73.4 | 67.0 | 72.3 | 71.7 |
| Haze (%) | | 0.4 | 0.9 | 0.6 | 0.5 |
| Tg of BP (° C.) | | −35.0 | −35.0 | −35.0 | −7.0 |
| Tg of TF (° C.) | | — | 130.0 | 50.0 | 68.0 |
| Surface concentration (wt %) of (A) according to XPS | | 0.0 | 53.0 | 88.5 | 65.8 |
| (I) Tg of surface layer (° C.) | | −35.0 | 31.0 | 37.3 | 38.0 |
| (II) Tg of entire pressure-sensitive adhesive (° C.) | | −35.0 | −25.8 | −31.4 | −2.6 |
| (I) − (II) | | 0.0 | 56.8 | 68.7 | 40.6 |

TABLE 5-continued

|  |  | CE 1 | CE 2 | CE 3 | CE 4 |
|---|---|---|---|---|---|
| Rolling ball tack | Ball No. | 12 | 8 | 6 | 5 |
| Peeling strength (adherend: glass) | 23° C. | 26.4 | 6.5 | 4.3 | 4.2 |
|  | 85° C. | 1.5 | 5.4 | 3.6 | 4.0 |
|  | 100° C. | 0.0 | 2.9 | 1.9 | 2.4 |
|  | 120° C. | 0.0 | 0.3 | 0.2 | 0.3 |
| Bubbling resistance (PET film/PC) | 85° C., 85% RH, 24 h | X | X | ○ | ○ |
|  | 100° C., 24 h | X | X | X | X |
|  | 120° C., 20 min | X | X | X | X |

CE: Comparative Example

In Examples 1 to 8 using a pressure-sensitive adhesive composition belonging to the invention of the present application, good heat resistance or in other words good peeling strength and bubbling resistance at 85° C., 100° C. and 120° C. were obtained. Good heat resistance was obtained at 120° C. in Examples 3 to 5 and 8. This heat resistance is attributed to the fact that the Tg values of the acrylic pressure-sensitive adhesive polymers (B) used in these pressure-sensitive adhesive compositions were in the range of −30° C. to 10° C., and particularly −25° C. to 0° C., and the Tg values of the pressure-sensitive adhesive layers as a whole were within the corresponding temperature range. Moreover, with the pressure-sensitive adhesive compositions of Examples 3 to 5 and 8 low tackiness was also achieved, showing that these compositions had the combined effects of heat resistance and low tackiness. The acrylic pressure-sensitive adhesives polymer (B) used in these examples all contained methyl acrylate and butyl acrylate, which are thought to have contributed to these effects.

It also appears from a comparison of Example 4 and Example 8 that a high number-average molecular weight and/or weight-average molecular weight of the acrylic pressure-sensitive adhesive polymer (B) contributes to peeling strength at high temperatures.

With the pressure-sensitive adhesive compositions of Comparative Examples 1 to 4, on the other hand, peeling strength and bubbling resistance at high temperatures were inadequate in all cases. These also did not exhibit low tackiness. Compared with the effects of the pressure-sensitive adhesive compositions of the examples, the Tg values of the surface layers of the pressure-sensitive adhesive layers were low in all cases, and there was a smaller difference between the Tg of the surface layer and the Tg of the entire pressure-sensitive adhesive layer.

INDUSTRIAL APPLICABILITY

The pressure-sensitive adhesive composition of the invention may be used favorably in various common pressure-sensitive adhesive products such as pressure-sensitive adhesive films, pressure-sensitive adhesive sheets, and pressure-sensitive adhesive tapes and labels. In particular, it can be used favorably in these products when high heat resistance is required. It may also be used in these products when high heat resistance and low tackiness are required. Specific examples of pressure-sensitive adhesive products include pressure-sensitive adhesive sheets, pressure-sensitive adhesive films, pressure-sensitive adhesive tapes, pressure-sensitive tapes, surface protective films, surface protective tapes, masking tapes, electrical insulating tapes, laminates and the like. Moreover, because the pressure-sensitive adhesive composition of the invention has excellent peeling strength and bubbling resistance on various adherends under high-temperature conditions, it may be affixed favorably to displays such as touch panels, liquid crystal display devices, organic EL display devices and plasma display panels, and to laminate various optical films used in these.

The invention claimed is:
1. A pressure-sensitive adhesive composition, comprising:
a vinyl polymer (A) and
an acrylic pressure-sensitive adhesive polymer (B),
wherein:
   the vinyl polymer (A) has a glass transition temperature (Tg) that is in a range of from 60° C. to 200° C. and a number-average molecular weight that is in a range of from 500 to 10,000,
   the vinyl polymer (A) is present in an amount that is in a range of from 0.5 mass parts to 60 mass parts per 100 mass parts of the acrylic pressure-sensitive adhesive polymer (B),
   the vinyl polymer (A) comprises a monomer unit derived from methyl methacrylate and a monomer unit derived from isobornyl methacrylate,
   the acrylic pressure-sensitive adhesive polymer (B) has a glass transition temperature that is in a range of from −21° C. to −7° C. and comprises a monomer unit derived from the group consisting of (meth) acrylic acid alkyl esters having $C_{1-3}$ alkyl groups in an amount that is in a range of from 20 mass % to 70 mass % of total monomer units constituting the acrylic pressure-sensitive adhesive polymer (B),
   when the pressure-sensitive adhesive composition is coated on a separator and dried to obtain a pressure-sensitive adhesive layer, a first Tg, which is a glass transition temperature of the pressure-sensitive adhesive layer as a whole, is in a range of from −30° C. to 5° C.,
   a second Tg, which is a glass transition temperature calculated from a surface layer part based on X-ray photoelectron spectroscopy of the pressure-sensitive adhesive layer, is in a range of from 50° C. to 180° C., and
   the vinyl polymer (A) comprises the monomer units derived from methyl meth acrylate and the monomer units derived from isobornyl methacrylate so that a total amount of the units is in a range of from 80 mass % to 100 mass % of total monomer units constituting the vinyl polymer (A).
2. A pressure-sensitive adhesive composition, comprising:
a vinyl polymer (A) and
an acrylic pressure-sensitive adhesive polymer (B),
wherein:
   the vinyl polymer (A) has a glass transition temperature (Tg) that is in a range of from 60° C. to 200° C. and a number-average molecular weight that is in a range of from 500 to 10,000, the vinyl polymer (A) is present in an amount that is in a range of from 0.5 mass parts to 60 mass parts per 100 mass parts of the acrylic pressure-sensitive adhesive polymer (B), the vinyl polymer (A) comprises a monomer unit derived from methyl methacrylate and a monomer unit derived from isobornyl methacrylate, the acrylic pressure-sensitive adhesive polymer (B) has a glass transition temperature that is in a range of from $-21°$ C. to $-7°$ C. and comprises a monomer unit derived from the group consisting of (meth)acrylic acid alkyl esters having $C_{1-3}$ alkyl groups in an amount that is in a range of from 20 mass % to 70 mass % of total monomer units constituting the acrylic pressure-sensitive adhesive polymer (B), when the pressure-sensitive adhesive composition is coated on a separator and dried to obtain a pressure-sensitive adhesive layer, a first Tg, which is a glass transition temperature of the pressure-sensitive adhesive layer as a whole, is in a range of from $-30°$ C. to $5°$ C., a second Tg, which is a glass transition temperature calculated from a surface layer part based on X-ray photoelectron spectroscopy of the pressure-sensitive adhesive layer, is in a range of from $50°$ C. to $180°$ C., the acrylic pressure-sensitive adhesive polymer (B) comprises the monomer unit that is derived from the (meth)acrylic acid alkyl ester having $C_{1-3}$ alkyl groups in an amount that is in a range of from 30 mass % to 60 mass % of total monomer units constituting the acrylic pressure-sensitive adhesive polymer (B), and the vinyl polymer (A) comprises the monomer units derived from methyl meth acrylate and the monomer units derived from isobornyl methacrylate so that a total amount of the units is in a range of from 80 mass % to 100 mass % of total monomer units constituting the vinyl polymer (A).

3. A pressure-sensitive adhesive composition, comprising:
a vinyl polymer (A) and
an acrylic pressure-sensitive adhesive polymer (B), wherein:

the vinyl polymer (A) has a glass transition temperature (Tg) that is in a range of from $60°$ C. to $200°$ C. and a number-average molecular weight that is in a range of from 500 to 10,000, the vinyl polymer (A) is present in an amount that is in a range of from 0.5 mass parts to 60 mass parts per 100 mass parts of the acrylic pressure-sensitive adhesive polymer (B), the vinyl polymer (A) comprises a monomer unit derived from methyl methacrylate and a monomer unit derived from isobornyl methacrylate, the acrylic pressure-sensitive adhesive polymer (B) has a glass transition temperature that is in a range of from $-21°$ C. to $-7°$ C. and comprises a monomer unit derived from the group consisting of (meth)acrylic acid alkyl esters having $C_{1-3}$ alkyl groups in an amount that is in a range of from 20 mass % to 70 mass % of total monomer units constituting the acrylic pressure-sensitive adhesive polymer (B), when the pressure-sensitive adhesive composition is coated on a separator and dried to obtain a pressure-sensitive adhesive layer, a first Tg, which is a glass transition temperature of the pressure-sensitive adhesive layer as a whole, is in a range of from $-30°$ C. to $5°$ C., a second Tg, which is a glass transition temperature calculated from a surface layer part based on X-ray photoelectron spectroscopy of the pressure-sensitive adhesive layer, is in a range of from $50°$ C. to $180°$ C., the acrylic pressure-sensitive adhesive polymer (B) further comprises a monomer unit derived from (meth)acrylic acid alkoxyalkyl esters having $C_{2-4}$ alkoxyalkyl groups so that the total amount of the monomer units derived from the (meth)acrylic acid alkyl ester having $C_{1-3}$ alkyl groups and the (meth)acrylic acid alkoxyalkyl esters having $C_{2-4}$ alkoxyalkyl groups is in a range of from 60 mass % to 80 mass % of total monomer units constituting the acrylic pressure-sensitive adhesive polymer (B), and the vinyl polymer (A) comprises the monomer units derived from methyl methacrylate and the monomer units derived from isobornyl methacrylate so that a total amount of the units is in a range of from 80 mass % to 100 mass % of total monomer units constituting the vinyl polymer (A).

\* \* \* \* \*